(12) United States Patent
Xu

(10) Patent No.: US 10,579,871 B2
(45) Date of Patent: Mar. 3, 2020

(54) BIOMETRIC COMPOSITE IMAGING SYSTEM AND METHOD REUSABLE WITH VISIBLE LIGHT

(71) Applicant: Hefei Xu, Beijing (CN)

(72) Inventor: Hefei Xu, Beijing (CN)

( * ) Notice: Subject to any disclaimer, the term of this patent is extended or adjusted under 35 U.S.C. 154(b) by 81 days.

(21) Appl. No.: 16/074,560

(22) PCT Filed: Feb. 3, 2016

(86) PCT No.: PCT/CN2016/073356
§ 371 (c)(1),
(2) Date: Nov. 1, 2018

(87) PCT Pub. No.: WO2017/132903
PCT Pub. Date: Aug. 10, 2017

(65) Prior Publication Data
US 2019/0065845 A1 Feb. 28, 2019

(51) Int. Cl.
*G06K 9/00* (2006.01)
*G06F 21/32* (2013.01)
(Continued)

(52) U.S. Cl.
CPC ......... *G06K 9/00604* (2013.01); *G06F 21/32* (2013.01); *G06F 21/602* (2013.01);
(Continued)

(58) Field of Classification Search
CPC ............. G06K 9/00604; G06K 9/0061; G06K 9/00906; G06K 9/2018; G06K 9/209; H04N 5/232123; H04N 5/2253; H04N 5/2258; H04N 5/2259; H04N 5/23222; H04N 5/23293; H04N 5/332; H04N 5/2354
See application file for complete search history.

(56) References Cited

U.S. PATENT DOCUMENTS

2018/0367725 A1* 12/2018 Li ................. H04N 5/23245
2019/0147606 A1*  5/2019 Zhuang ............ G06T 7/246
                                                     348/47
2019/0342491 A1* 11/2019 Mandavilli ........ G06K 9/00228

FOREIGN PATENT DOCUMENTS

CN          103593647       2/2014
CN          104394306       3/2015
(Continued)

*Primary Examiner* — Mishawn N. Hunter
(74) *Attorney, Agent, or Firm* — Warner Norcross + Judd, LLP

(57) ABSTRACT

An object of the present invention is to provide a biological feature composite imaging technology that multiplexing of the imaging functions and a mobile terminal comprising said composite imaging system. The composite imaging system comprises: a lens assembly (130); an optical filter assembly (120) including at least a visible light bandpass region and an infrared light bandpass region; an image sensor (110) that includes a visible light imaging region, an infrared light imaging region, and a transition region between said two regions, said image sensor (110) operating under one of the visible light imaging mode and the infrared light imaging mode. Under the infrared light imaging mode, specific physical properties of the biological features are used as the image quality information to realize auto-focus of the biological features in the region of interest.

24 Claims, 22 Drawing Sheets

(51) Int. Cl.
*H04N 5/232* (2006.01)
*H04N 5/225* (2006.01)
*H04N 5/235* (2006.01)
*H04N 5/33* (2006.01)
*G06F 21/60* (2013.01)
*G06F 21/62* (2013.01)
*G06K 9/20* (2006.01)
*G06K 9/46* (2006.01)

(52) U.S. Cl.
CPC ....... *G06F 21/6245* (2013.01); *G06K 9/0061* (2013.01); *G06K 9/00906* (2013.01); *G06K 9/209* (2013.01); *G06K 9/2018* (2013.01); *H04N 5/2253* (2013.01); *H04N 5/2258* (2013.01); *H04N 5/2259* (2013.01); *H04N 5/2354* (2013.01); *H04N 5/23222* (2013.01); *H04N 5/23293* (2013.01); *H04N 5/232123* (2018.08); *H04N 5/332* (2013.01); *G06K 9/4661* (2013.01); *H04N 5/2254* (2013.01); *H04N 5/2256* (2013.01); *H04N 5/23212* (2013.01); *H04N 5/23245* (2013.01)

(56) References Cited

FOREIGN PATENT DOCUMENTS

| | | |
|---|---|---|
| CN | 204362181 | 5/2015 |
| CN | 105100567 | 11/2015 |
| WO | 2014014153 | 1/2014 |
| WO | 2014205021 | 12/2014 |

* cited by examiner

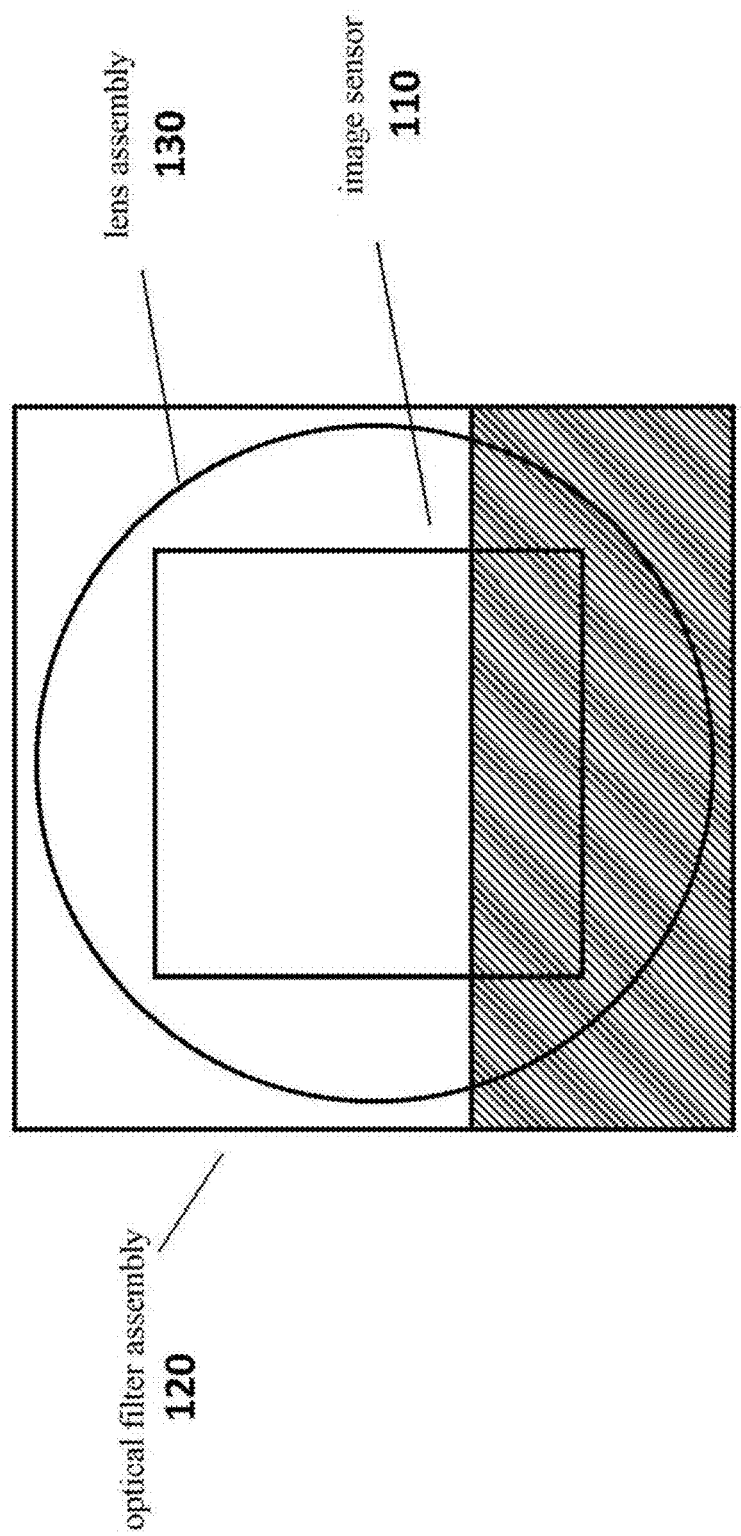

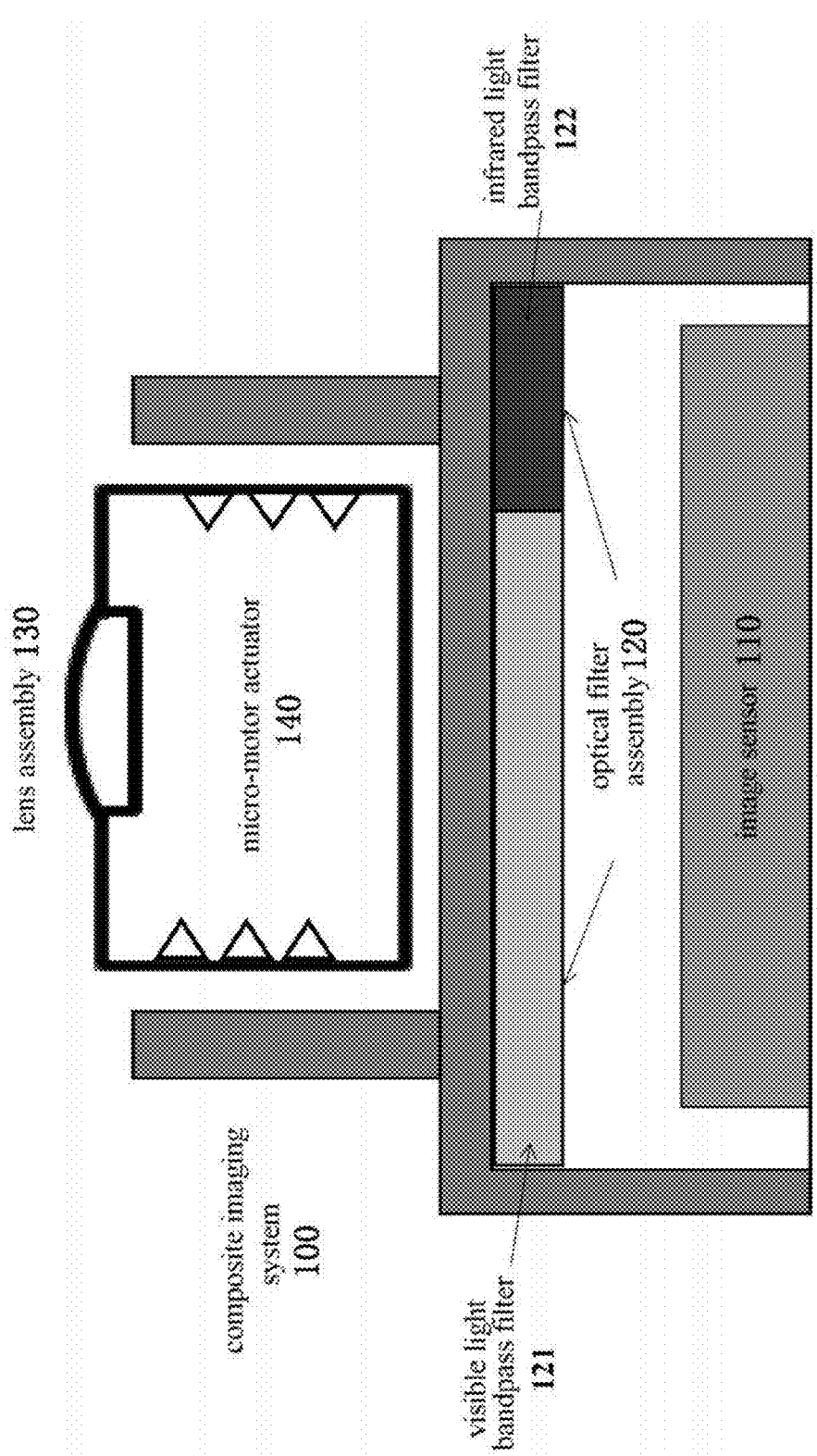

BIOMETRIC COMPOSITE IMAGING SYSTEM AND METHOD REUSABLE WITH VISIBLE LIGHT

TECHNICAL FIELD

The present invention relates to the technical fields of image processing, bio-recognition, and optical imaging, in particular to a biological feature composite imaging technology with multiplexing of visible light.

BACKGROUND OF THE INVENTION

The biological recognition technique is an emerging identity recognition technique. In order to realize stable recognition, most biological recognition techniques (including face recognition, iris recognition and 3D face recognition) use the near infrared imaging technique, namely, an infrared light source is used to actively illuminate biological features, and a camera technique is used to receive digitized near infrared images of the biological features obtained by reflection of the infrared light source so as to make recognition.

Iris recognition is an emerging biological recognition technique, which is applied more and more widely in the field of identity recognition. Safe and convenient identity recognition is a challenge in offering services for mobile terminal-based business. Currently, using mobile terminals as the means for identity confirmation mainly depends on passwords and cards, which has problems such as hard to memorize, vulnerable to being stolen and less secure. Among various identity recognition techniques, iris recognition has the highest security and precision, and it has many advantages such as unique individual, requiring no memorizing, theft-proof and high security level.

Under the present state of art, in order to add the function of iris recognition on a mobile terminal (such as a mobile phone), a near infrared camera module needs to be added on the front side of the mobile phone, which is independent from the front-facing visible light camera module for selfie. That is to say, two holes need to be provided on the front panel of the mobile phone, one is for selfie and the other is for iris imaging, so the industrial design becomes complex and the appearance is not good-looking.

In the prior art, for people of different races with eye color of yellow, brown and black, the iris imaging design realized by the near infrared camera module generally uses imaging of the infrared light with a frequency spectrum band of 760 nm-880 nm; an extra infrared light source (between 760 nm-880 nm) is needed for light-supplementing illumination, and the near infrared camera module requires energy that can receive said infrared band.

The iris recognition employed on the mobile phone is mainly used for identity recognition of the user himself, so it is usually used in a front-facing manner for user experience; but the existing front-facing selfie camera on the mobile phone cannot receive the light source of said infrared band or receives it with great attenuation due to the coating filtration for the camera per se. Therefore, the iris recognition in the prior art requires a separate near infrared camera for iris imaging, while it cannot multiplex with the existing camera (e.g. existing front-facing color camera on a smart mobile phone) for visible light imaging (with a spectral frequency of 380-760 nm). As a result, the size of the iris imaging system increases greatly, the cost increases, the design becomes complicated, the user experience is not good, and the iris imaging system cannot be miniaturized to be integrated into mobile terminals that are more widely needed.

Therefore, a technical bottleneck at present is how to use one camera for two functions, i.e. the normal function of visible light imaging for front-facing selfie and the function of infrared imaging for biological recognition.

Multiplexing a single camera on the mobile device can achieve both the normal function of visible light imaging for front-facing selfie and the function of infrared imaging for biological recognition, and methods for realizing the dual band imaging of near infrared and visible light mainly include: adding a mechanically switchable infrared light filter in the imaging system (see China patent CN201420067432.X), using an optical filter having infrared and visible light dual band transmission spectrum (see U.S. Pat. No. 8,408,821, China patent CN104394306A), and an image sensor with pixels that can detect both visible and infrared light (see U.S. Pat. No. 7,915,652, China patent CN104284179A).

The mechanically switchable infrared light filter (see China patent CN201420067432.X) has a relatively large size, so it cannot be widely used on mobile devices. The U.S. Pat. No. 8,408,821 disclosed using a dual-bandpass optical filter to allow passage of the visible light and the infrared light at the same time, but in this case, the visible light part will be interfered by the infrared light and the images will become reddish, meanwhile, the infrared light part will be influenced by the visible light waveband and the precision of biological recognition will be affected; besides, the patterned optical filter is not used. The optical filter in the China patent CN104394306A includes a first region and a second region, the first region is a dual band pass coating which can allow passage of visible light and infrared at the same time, and the second region is an IR band pass coating, which can only allow passage of infrared light with a specific wavelength. Engineering implementation of such a method on a smart phone is problematic, because such a design will cause infrared light to enter into the first region to make the selfie reddish, moreover, the infrared light signal passing through the second region cannot completely correct the reddish effect, because the imaging areas of these two regions are inconsistent in the same frame, and due to the different photosensitive contents, factors for perfect correction cannot be determined stably to correct the problem of the reddish selfie, especially when the background color is green, thus the selfie effect becomes poor, which is unacceptable by users with demand of high quality front-facing selfie function of mobile phones; meanwhile, when the first region is used for infrared biological recognition imaging, since the visible light can also pass through it, the iris features, for example, will be affected by light spots, such as bright spots reflected by spectacles, lamplight and windows, reflected by complex visible light from the external environment. In the design of the multi-region double-spectrum imaging device, either the quality of the selfie or the performance of infrared biological recognition will be affected, and it is impossible to have it both ways. Especially, the biological feature imaging will be influenced by visible light from the complex external environment, which results in deterioration of the quality of the collected biological feature images, and the recognition precision of the back end algorithm and the user experience will be severely disrupted. The problem of axial chromatic aberration of visible light and infrared imaging is not considered, so the image quality of selfie will be affected, besides, it only mentions to use the voice coil motor to adjust the focal point, without providing the method of realizing auto zoom for double-spectrum imaging. The U.S. Pat. No. 7,915,652 relating to infrared light only relates to the design of an image sensor for double-spectrum imaging, but it does not provide the design for the entire imaging system. The multi-spectrum optical filters for different regions as used in the China patent CN104284179A) are a color filter array attached to the surface of the image sensor, rather than independent optical filters. In addition, this design does not give consideration to the problem of axial chromatic aberration of visible light and infrared imaging, so it is difficult to collect near infrared iris images that meet the requirements for recognition at the normal distances of use for mobile devices

SUMMARY OF THE INVENTION

An object of the present invention is to provide a biological feature imaging system and method, which can use a group of image sensors to realize multiplexing of the imaging functions, thus both the normal function of visible light imaging for front-facing selfie and the function of infrared imaging for biological recognition can be realized, that is, both needs of visible light selfie and infrared biological feature recognition are taken into account.

An object of the present invention is to provide a biological feature composite imaging system and method that use a group of lens assemblies to realize multiplexing of the infrared and visible light imaging functions, and a mobile terminal comprising said composite imaging system.

The biological feature imaging system and method according to the present invention can meet the user's need of normal photographing function and can also be used for collecting near infrared images of biological features (e.g. the iris), and it can realize fast focusing of the biological features.

By means of a design of a group of patterned bandpass optical filters, the present invention splits an incident multi-spectrum light source into light of two groups of waveband optical paths to be received by an image sensor. Wherein one optical filter A in said optical filter group structure has a coating that can facilitate reflecting of infrared wavebands and transmitting of visible light wavebands, and the other optical filter B has a coating that can facilitate transmitting of infrared wavebands and reflecting of visible light wavebands. In the camera module, a group of optical filters A and B is preferably placed between an image sensor chip and an optical lens, and they do not overlap on the incident light path. When the camera is in operation, incident light will be filtered and divided into a visible light part and an infrared light part after passing through said optical filter group, and will be received by corresponding regions of the same image sensor; according to the different areas of the optical filters A and B and the different positions of the optical filters from the image sensor, regions of the image sensor are correspondingly divided into three different imaging regions, i.e. a visible light imaging region, an infrared light imaging region, and a transition region in which visible light imaging and infrared light imaging overlap. When designing the module structure, the optical filters are very close to the image sensor, so the transition region in which visible light imaging and infrared light imaging overlap is small in area and it mainly affects images of visible light imaging. In the subsequent software switching procedure, it is possible to output the visible light images with the transition region removed.

By means of such a structure design, in the normal selfie mode, the image sensor can preferably output only the visible light selfie images having the size of the visible light imaging region with the transition region removed, so the collected selfie images will not become reddish due to the infrared light; in the infrared imaging mode, the image sensor can preferably output only the infrared light images having the size of the infrared light imaging region, and the collected biological feature images will not be affected by noise produced by the visible light in the complex surrounding environment, for example, the iris texture may be corrupted by bright spots in the eye caused by visible light reflected from the window, or the specular reflection of ambient light on the eyeglasses, thus affecting the recognition accuracy and user experience. Output images of the two modes do not interfere with each other, so it is the most preferable two-in-one solution.

Unlike the prior art, the present invention can achieve multiplex imaging of visible light and infrared light without the need to switch between different optical filters, and it does not need any motion component for the optical filter, and it can help enhance the mechanical stability and durability of the system, especially when the mobile terminal falls to the ground.

The present invention provides a biological recognition composite imaging system and method that multiplexes visible light imaging and infrared light imaging, in particular, the present invention provides an improved system and method that use one camera module to perform dual-mode composite imaging for visible light (selfie) and infrared light (biological feature imaging). The system and method of the present invention include image signal processor (ISP) parameter settings and system application workflows for two different operation modes, in particular an improved iris recognition algorithm implementation pipeline from output of ISP to data encryption and transmission, handshake signals, pre-processing and template matching under the infrared light imaging mode. Meanwhile, the present invention also provides a method for performing biological feature liveness detection by taking the advantage of the dual mode imaging system according to the innovation point of the present invention.

The composite imaging system of the present invention innovatively uses an improved image sensor that images in different regions (one region including a color filter and the other region including no color filter) in cooperation with patterned dual bandpass optical filters to realize composite imaging of visible light and infrared light with a single lens; wherein the design of removing the color filter increases absorption of light energies with the near infrared wavelengths of 760-880 nm in the corresponding image sensor region thereof, thereby reducing power consumption of the active illumination light source and realizing the design of low power consumption of the mobile terminal device for near infrared biological feature imaging.

According to one aspect of the present invention, a biological feature composite imaging system with multiplexing of the imaging functions is provided, which comprises a lens assembly for receiving light from a region of interest; an optical filter assembly for filtering the received light so as to image light with a waveband for which passage is allowed, the optical filter assembly including at least a visible light bandpass region that allows only the visible light to pass through the optical filter assembly and an infrared light bandpass region that allows only the infrared light to pass through the optical filter assembly; an image sensor that includes a visible light imaging region, an infrared light imaging region, and a transition region between said two regions, said image sensor operating under one of the visible light imaging mode and the infrared light imaging mode, wherein the visible light imaging region images the visible light passing through the visible light bandpass region under the visible light imaging mode, and the infrared light imaging region images the infrared light passing through the infrared bandpass region under the infrared light imaging mode, wherein the infrared light is from biological features; wherein under the infrared light imaging mode, specific physical properties of the biological features are used as the image quality information to realize auto-focus of the biological features in the region of interest.

According to another aspect of the present invention, a biological feature composite imaging method with multiplexing of the imaging functions is provided, which comprises: receiving light from the region of interest; selecting one of at least two imaging modes according to a user input, said imaging modes including a visible light imaging mode and an infrared light imaging mode; filtering the received light under the selected imaging mode, wherein the visible light is to be passed under the visible light imaging mode, and the infrared light is to be passed under the infrared light imaging mode; and imaging the filtered light on a corresponding region of the image sensor, wherein the passed visible light is imaged and output under the visible light imaging mode, and the passed infrared light is imaged and output under the infrared light imaging mode, wherein the infrared light is from biological features; wherein under the infrared light imaging mode, specific physical properties of the biological features are used as the image quality information to realize auto-focus of the biological features in the region of interest.

According to still another aspect of the present invention, a mobile terminal for biological feature composite imaging is provided, which comprises: an infrared light source for emitting infrared light to biological features; a screen for displaying images and providing an eye image preview window that guides a user to cooperate in collecting biological feature images, said eye image preview window being at an upper part of the screen area along the length direction of the mobile terminal; a composite imaging camera module, which further comprises: a lens assembly for receiving light from a region of interest; an optical filter assembly for filtering the received light so as to image light with a waveband for which passage is allowed, the optical filter assembly including at least a visible light bandpass region that allows only the visible light to pass through the optical filter assembly and an infrared light bandpass region that allows only the infrared light to pass through the optical filter assembly; an image sensor which includes a visible light imaging region, an infrared light imaging region, and a transition region between said two regions, said image sensor operating under one of the visible light imaging mode and the infrared light imaging mode, wherein the visible light imaging region images the visible light passing through the visible light bandpass region under the visible light imaging mode, and the infrared light imaging region images the infrared light passing through the infrared bandpass region under the infrared light imaging mode, wherein the infrared light is from biological features; wherein the eye image preview window previews and outputs the infrared light imaging region of the image sensor and outputs only the biological feature images of the infrared light imaging region.

BRIEF DESCRIPTION OF THE DRAWINGS

Other features, objects and advantages of the present invention will become clearer by referring to the detailed descriptions of the non-limiting embodiments made with reference to the following drawings:

FIG. 2a is a front view of relative positions of an image sensor, an optical filter assembly and a lens assembly;

FIG. 2b is a sectional view of relative positions of the image sensor, the optical filter assembly and the lens assembly;

FIGS. 16a-16c show a preferred embodiment of a mobile terminal comprising the composite imaging system, wherein FIGS. 16a and 16b show the structural configuration of the mobile terminal, and FIG. 16c shows the user experience when the mobile terminal is being used; and FIGS. 17a-17c show another preferred embodiment of a mobile terminal comprising the composite imaging system, wherein FIGS. 17a and 17b show the structural configuration of the mobile terminal, and FIG. 17c shows the user experience when the mobile terminal is being used.

Figure 1A:
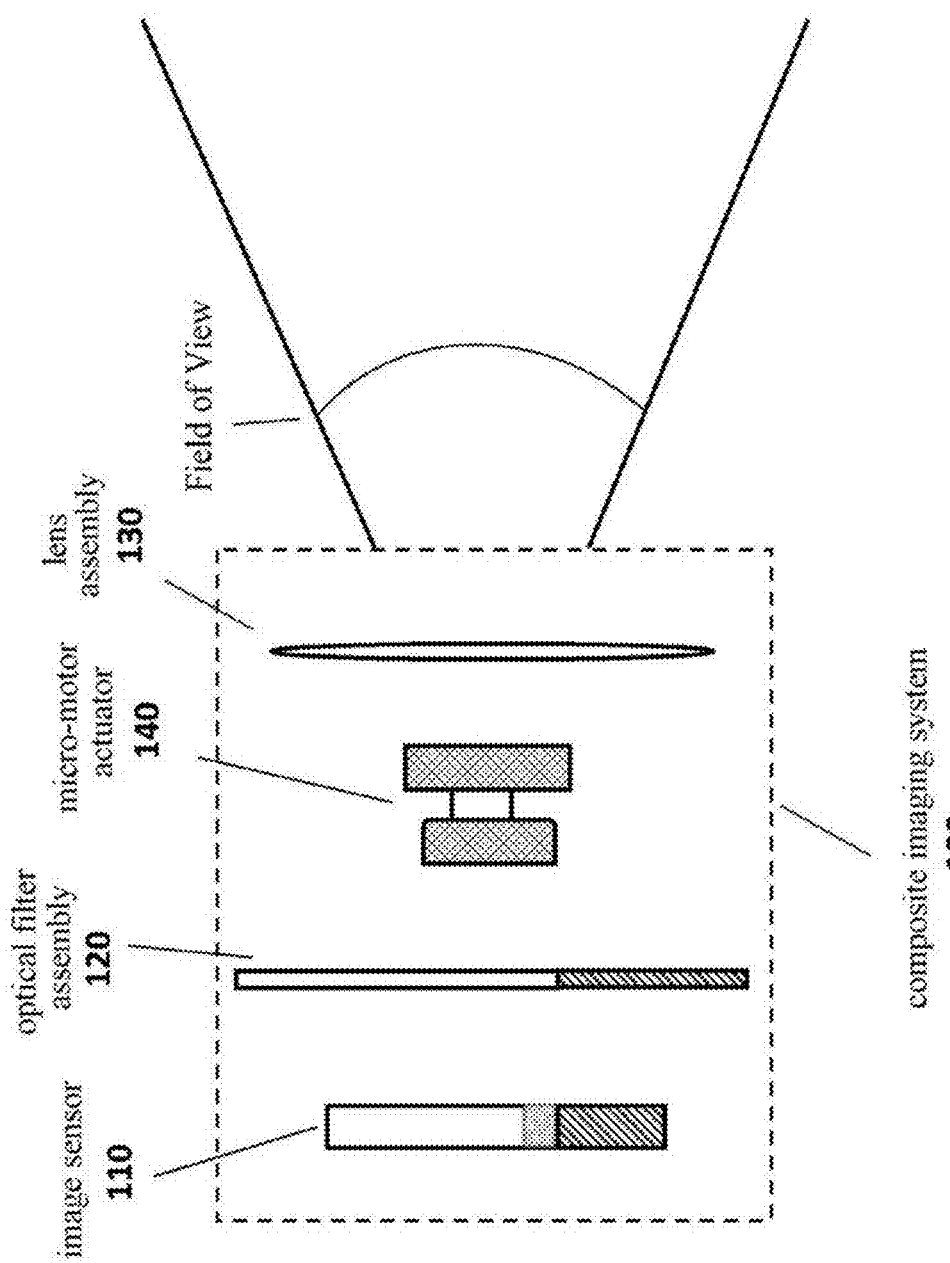
FIGS. 1a and 1b are schematic drawings of a biological feature composite imaging system according to the present invention.

In the drawings, the same or similar reference signs represent the same or similar components.

DETAILED DESCRIPTION OF THE INVENTION

Those skilled in the art shall understand that the present invention can be implemented by other embodiments that do not include the details described herein. In order not to blur the present invention, details of known functions and structures that are not essential are omitted in the descriptions herein.

The present invention will be described in further detail below with reference to the drawings.

In the structure of the composite imaging system of the present invention, a structure of a group of optical filters including two optical filter regions A and B (e.g. two optical filters) is preferably disposed between an image sensor chip and an optical lens, and they do not overlap on the incident light path. When the composite imaging system is in operation, incident light will be filtered and divided into a visible light part and an infrared light part after passing through said structure of optical filter group, and will be received by corresponding regions of the same image sensor. According to the different areas of the optical filters A and B and the different positions of the optical filters from the image sensor, regions of the image sensor are correspondingly divided into three different imaging regions, i.e. a visible light imaging region, an infrared light imaging region, and a transition region in which visible light imaging and infrared light imaging overlap. When designing the module structure, the optical filters are very close to the image sensor, so the transition region in which visible light imaging and infrared light imaging overlap is small and it mainly affects images of visible light imaging. In the subsequent software switching procedure, it is possible to output the visible light images with the transition region removed.

Figure 1B:
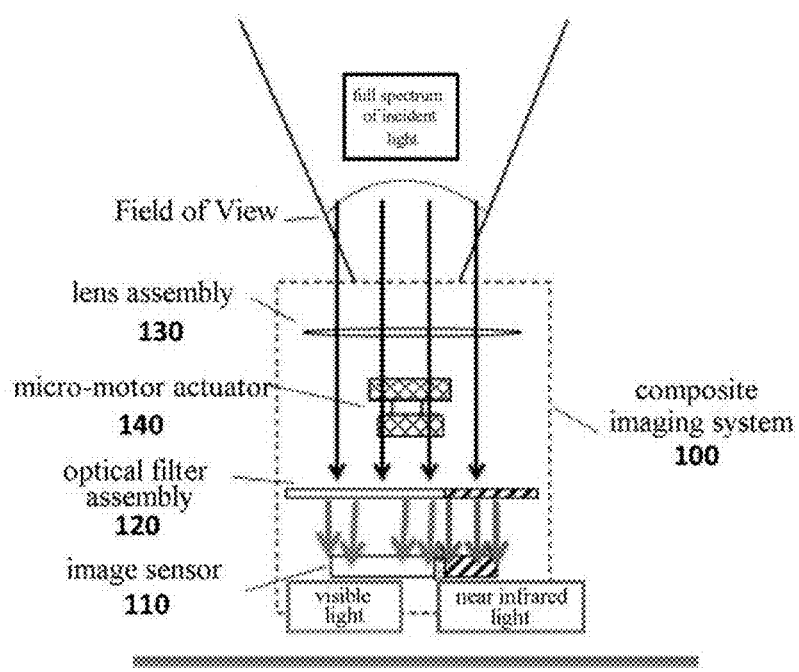

FIGS. 1a and 1b are schematic drawings of a biological feature composite imaging system according to the present invention. As shown in FIGS. 1a and 1b, a composite imaging system 100 comprises an image sensor 110, an optical filter assembly 120, a lens assembly 130 and a micro-motor actuator 140.

Figure 1C:
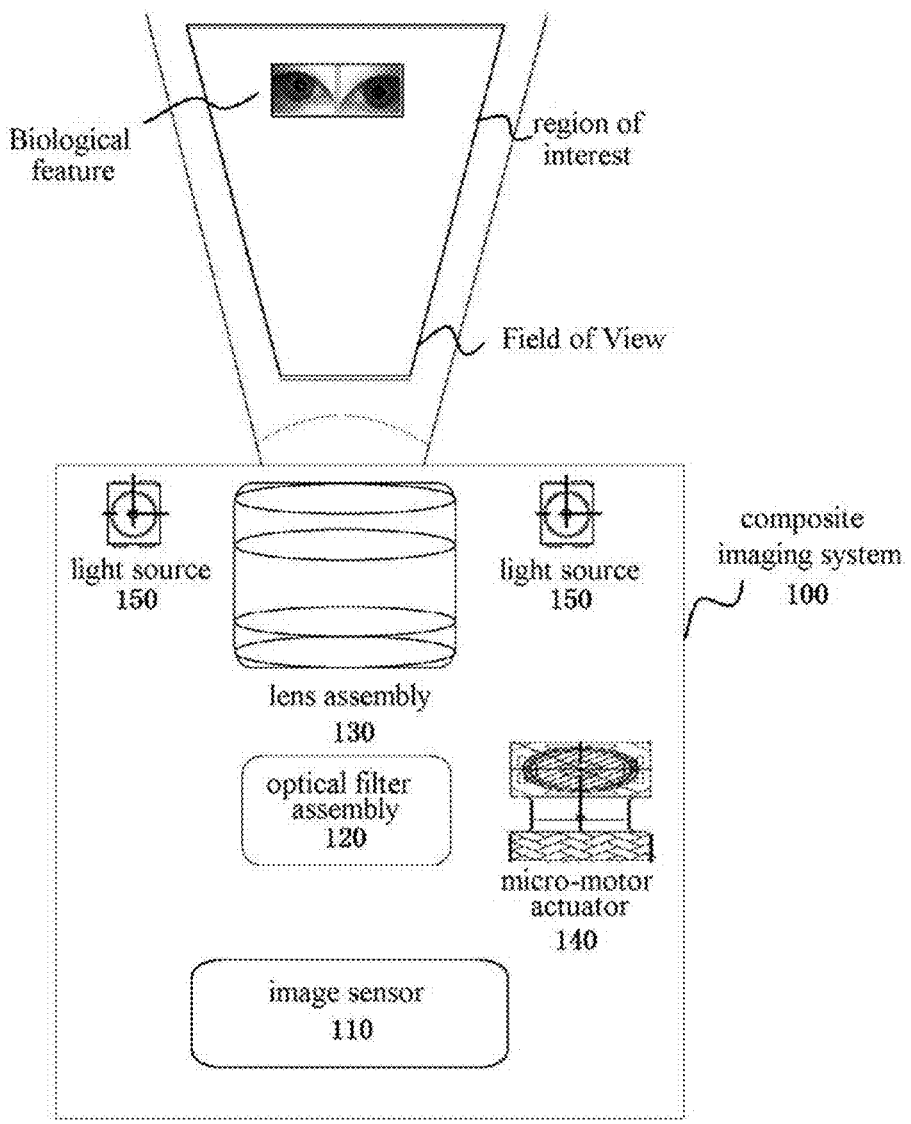
FIG. 1c is a detailed schematic drawing of the biological feature composite imaging system according to the present invention.

FIG. 1c is a detailed schematic drawing of the biological feature composite imaging system according to the present invention, which further shows a light source 150 as well as a positional relationship between a Field of View (FoV) of the composite imaging device with the region of interest and biological features in addition to the schematic positional relationship among the image sensor 110, the optical filter assembly 120, the lens assembly 130 and the micro-motor actuator 140 in FIGS. 1a and 1b. It shall be noted that the light source 150 in FIG. 1c is merely schematic, and the present invention is not limited to the schematic configuration of the light source 150 in FIG. 1c.

FIGS. 2a, 2b to FIG. 7 show the specific structures and relative positions of components in the composite imaging system. Wherein FIG. 2a is a front view of relative positions of the image sensor 110, the optical filter assembly 120 and the lens assembly 130, and FIG. 2b is a sectional view of relative positions of the image sensor, the optical filter assembly and the lens assembly. In the composite imaging system 100 according to the present invention, the lens assembly 130 has a certain Field of View (FoV) and receives light from a multispectral light source.

Incident light from the multispectral light source passes through the lens assembly to arrive at the optical filter assembly 120. The optical filter assembly is a design of a group of bandpass optical filters for different regions and different wavebands, and it includes a visible light bandpass region that only allows passage of light of the visible light waveband and an infrared light bandpass region that only allows passage of light of the infrared light waveband. Preferably, as shown in FIG. 2b, the visible light bandpass region and the infrared light bandpass region can be a visible light bandpass filter 121 and an infrared light bandpass filter 122, respectively. Then, the incident multispectral light source is split into light in two wavebands and is received by the image sensor. Preferably, the visible light bandpass filter 121 in the optical filter assembly 120 has a coating that can facilitate reflecting of infrared light wavebands and transmitting of visible light wavebands, and the infrared light bandpass filter 122 has a coating that can facilitate transmitting of infrared light wavebands and reflecting of visible light wavebands. The image sensor 110 is an array of the image sensor pixels, which transmits digital image pixel data collected by the image sensor to a back end encryption chip or a processor through a data transmission interface (e.g. an MIPI interface). In the structure of the composite imaging system of the present invention, the optical filter assembly 120 is placed on in front of the image sensor 110 on the optical path, so that light arriving at the image sensor 110 has already been filtered by the optical filter assembly 120, namely, the multispectral light incident through the lens assembly 130 is divided by the optical filter assembly 120 into light in the visible light waveband and light in infrared light waveband and is received by different parts of the image sensor. Since the visible light bandpass filter 121 and the infrared light bandpass filter 122 in the optical filter assembly 120 occupy different areas on the optical path, the image sensor 110 may include a visible light imaging region and an infrared light imaging region corresponding to the visible light bandpass region (e.g. the visible light bandpass filter 121) and the infrared light bandpass region (e.g. the infrared light bandpass filter 122), respectively, and a software can be used to divide up said two regions. In addition, the image sensor 110 may further include a transition region in which visible light imaging and infrared light imaging overlap. The visible light imaging region of the image sensor 110 images the visible light passing through the visible light bandpass region on its corresponding optical path, and the infrared light imaging region images the infrared light passing through the infrared light bandpass region on its corresponding optical path.

In order to make sure that the image sensor 110 can be completely covered by the optical filter assembly 120 on the imaging optical path, in the composite imaging system of the present invention, the area of the optical filter assembly 120 is larger than the area of the image sensor 110. Since the thicknesses of imaging modules on mobile phones are required to be lower and lower at present, the interval between the optical filter assembly and the image sensor needs to be very small (usually smaller than 2 mm), and in such a range of interval, the error for diffusion propagation of light in view of wide angle is very small, which can be neglected.

The image sensors currently used in mobile terminals like mobile phones and tablet PCs are composed of an array of pixels. During production, a micro lens and a color filter are usually added on the silicon substrate of the image sensor. Generally speaking, a corresponding color filter needs to be provided for each pixel to capture the color information. Adding the color filter can help correct reddish color and improve color reproduction in the visible light images; while removing the color filter can improve absorption of light energies in the waveband of 760-880 nm by the pixels.

The composite imaging system of the present invention innovatively uses an improved image sensor that images in different regions (wherein the visible light imaging region has the color filter and the infrared light imaging region has the color filter removed) in cooperation with patterned dual bandpass optical filters to realize composite imaging of visible light and infrared light with a single lens. Wherein the design of removing the color filter can increase respective frequency spectrum sensitivity of the corresponding image sensor regions with respect to the infrared spectral range, and increase absorption of light energies in the near infrared waveband of 760-880 nm, thereby optimizing and enhancing image quality of iris imaging in said regions. That is, same level of reception of infrared spectral energy can be achieved using IR LED light source with lower radiant intensity, and detailed texture of iris can be maintained in the acquired iris images using similar IR LEDs, thus lowering the power consumption requirement of the system of the present invention on the active illumination light source and realizing a design of low power consumption for near infrared biological feature imaging for a mobile terminal device.

According to an embodiment of the present invention, the composite imaging system 100 includes the color filter corresponding to the visible light imaging region of the image sensor 110, while the color filter corresponding to the infrared light imaging region of the image sensor 110 is removed.

By means of such a structural design, under the selfie visible light mode, the image sensor may preferably output only the selfie visible light images having the size of the visible light imaging region with the transition region removed. The collected selfie images will not become reddish due to the interference of the infrared light; in the infrared light mode, the image sensor can preferably output only the infrared light images having the size of the infrared light imaging region, and the collected biological feature images will not be affected by noise produced by the visible light in the complex surrounding environment, for example, the iris texture may be corrupted by bright spots in the eye caused by visible light reflected from the window, or the specular reflection of ambient light on the eyeglasses, thus affecting the recognition accuracy and user experience. Output images of such two modes do not interfere with each other, so it is the most preferable two-in-one solution.

Unlike the prior art, the present invention can achieve multiplexed imaging of visible light and infrared light without the need to switch between different optical filters, and it does not need any motion component for the optical filter, and it can help enhance the mechanical stability and durability of the system, especially when the mobile terminal falls to the ground.

The focus range for visible light imaging is far in the current mobile phones and tablet PCs, while the focus range of infrared imaging for biological recognition is close, so if the focal length of the imaging system is fixed, it is difficult to acquire in-focus images for both imaging modes.

As shown in FIG. 1, the composite imaging system 100 of the present invention may further comprise a micro-motor actuator 140, which controls a motion component (not shown) to move the lens assembly 130 to adjust the focus for the visible and infrared light imaging modes. The use of the motion component can solve the problem of axial focal length chromatic aberration in visible light and infrared light imaging. Specifically, the motion component is used for adjusting movement of the lens assembly. The micro-motor actuator 140 is used for adjusting the focal lengths for visible and infrared light imaging to realize different operation modes (generally, the front-facing visible light mode of the mobile terminal is mainly used for selfie, and the infrared light imaging mode is mainly used for imaging biological features (e.g. iris features), and because the iris features are sophisticated, the best focus set for iris imaging is closer to the image sensor than that for visible light imaging. Alternatively, image quality information of electronic images is obtained, and the micro-motor is controlled to adjust the lens assembly according to the image quality information of the electronic images, so as to achieve controlling of the autofocus of the biological features in the region of interest.

Figure 3:
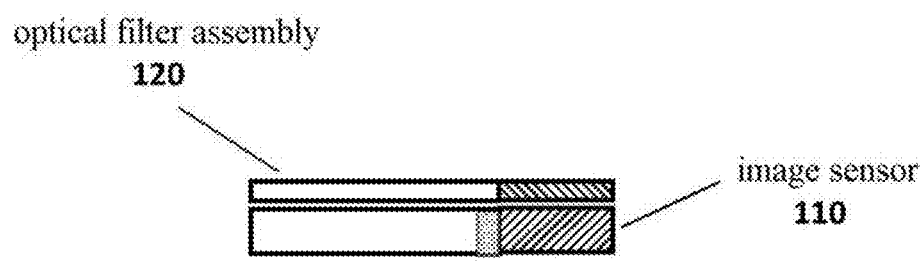
FIG. 3 is a position diagram of an optical filter assembly being placed on top of an image sensor.

FIG. 3 is a position diagram of the optical filter assembly 120 being placed on top of the image sensor 110. The optical filter assembly 120 can be a separate element independent from the image sensor 110 (i.e. the area of the optical filter assembly 120 is slightly larger than the area of the image sensor 110), or it can be packaged above the surface of the silicon substrate of the image sensor via packaging process, as shown in FIG. 3.

Figure 4:
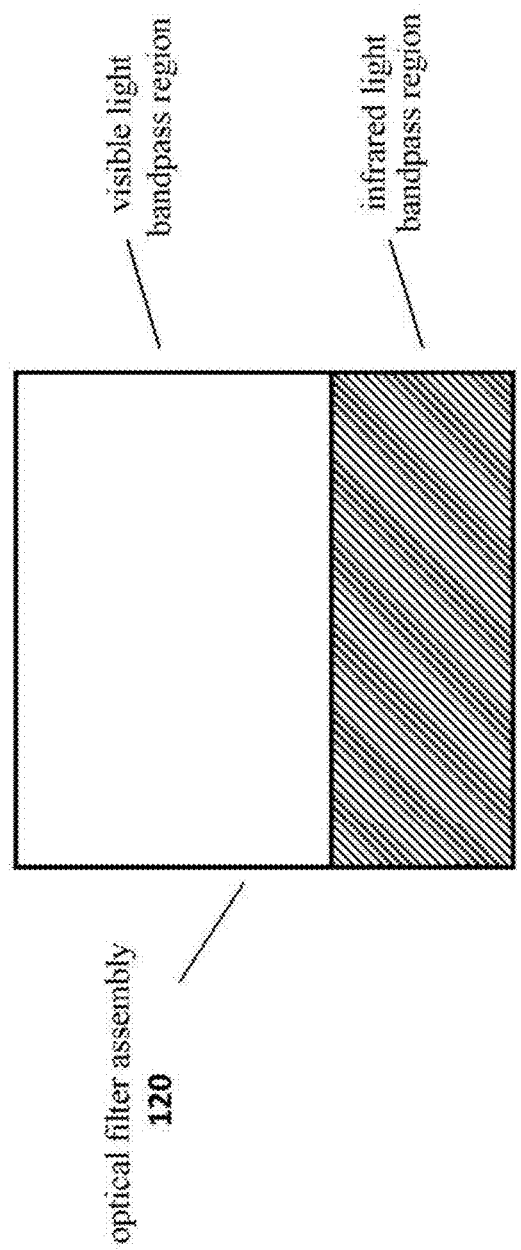
FIG. 4 is a schematic front view of an image sensor.
Figure 5:
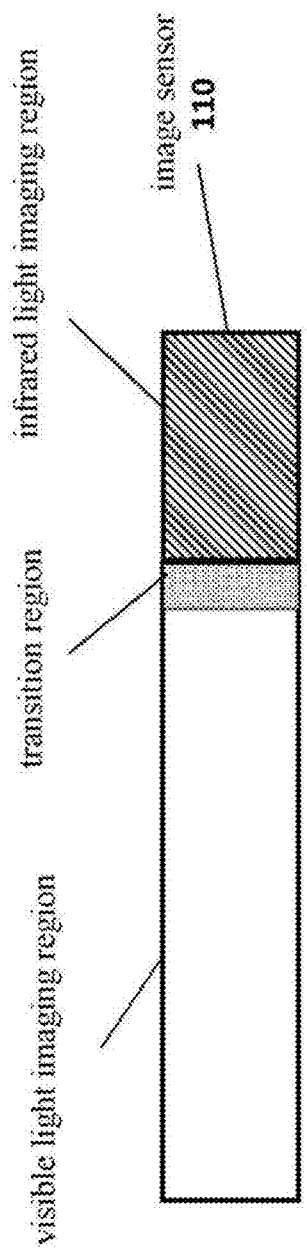
FIG. 5 is a schematic side view of an image sensor.

FIG. 4 is a schematic front view of the image sensor 110, and FIG. 5 is a schematic side view of the image sensor 110. The image sensor 110 according to the present invention includes a region for visible light imaging, a region for infrared light imaging, and a transition region between said two regions. The region for visible light imaging, the region for infrared light imaging, and the transition region between said two regions of the image sensor 110 are shown in FIGS. 4 and 5. In order to meet both the requirement of large imaging range (corresponding to a large Field of View) for the imaging application (e.g. selfie) in the visible light mode and the requirement of image resolution (number of pixels in a unit area) precision and minimum resolution for the imaging application (e.g. iris imaging) in the infrared light mode, the image sensor 110 in the composite imaging system 100 of the present invention may be an image sensor with a large number of pixels. Take the iris of an ordinary human as an example, which has an average diameter of 11 mm, according to the ISO standard, an outer circle diameter of the iris of one eye in the image needs to include 120 pixels. If a lens whose horizontal FOV is 60 degrees can be used for iris recognition in a normal use distance (30CM), the horizontal direction of the image sensor needs to have at least 3773 pixels, and for an aspect ratio of 16:9 of the image, the vertical direction needs to have 2120 pixels, which means that the total number of pixels is 8M. In view of the actual number of pixels of the image sensor in the horizontal and vertical directions, a CMOS image sensor (4680(W)×3456(H)) containing more than 8M pixels, e.g. 13M pixels, is used preferably.

Figure 6:
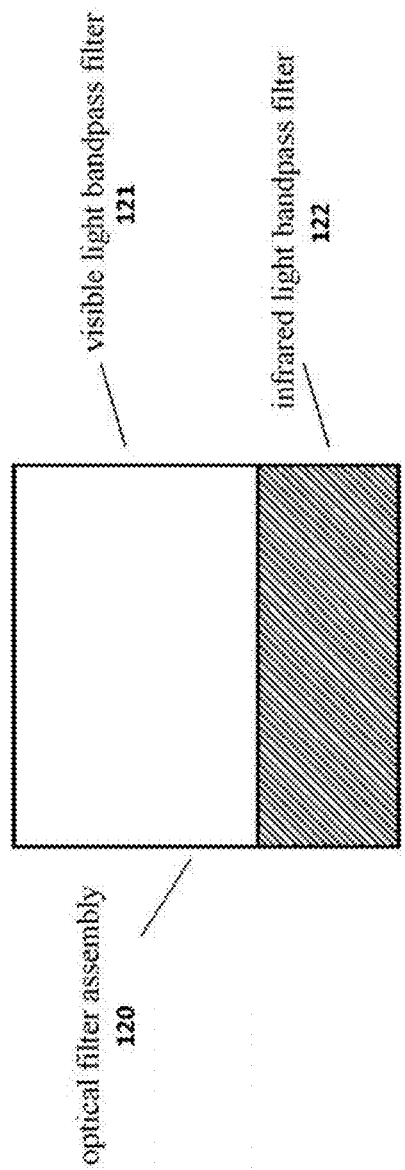
FIG. 6 is a schematic front view of an optical filter assembly.
Figure 7:
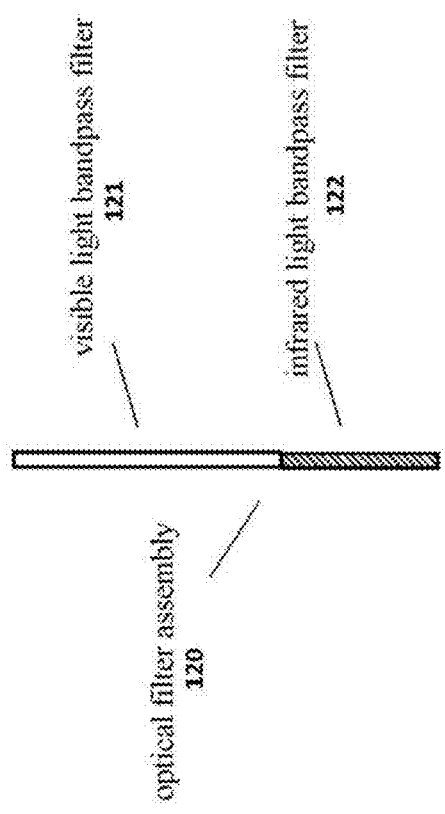
FIG. 7 is a schematic side view of an optical filter assembly.

FIG. 6 is a schematic front view of the optical filter assembly 120 and FIG. 7 is a schematic side view of the optical filter assembly 120. The visible light bandpass filter 121 (for visible light) and the infrared light bandpass filter 122 (for infrared light) in the optical filter assembly 120 correspond to the region for visible light imaging and the region for infrared light imaging of the image sensor 110, respectively.

Figure 8:
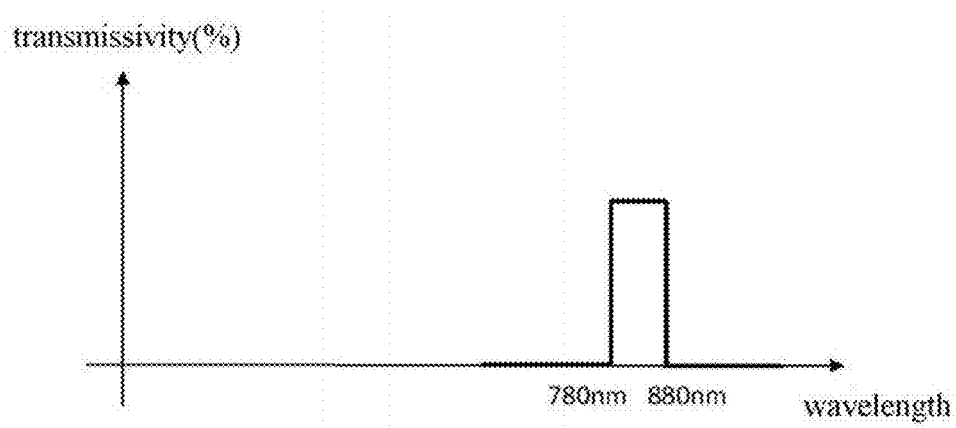
FIG. 8 is a spectral characteristic diagram of a visible light bandpass filter in the optical filter assembly in a visible light waveband (e.g. 380-760 nm)
Figure 9:
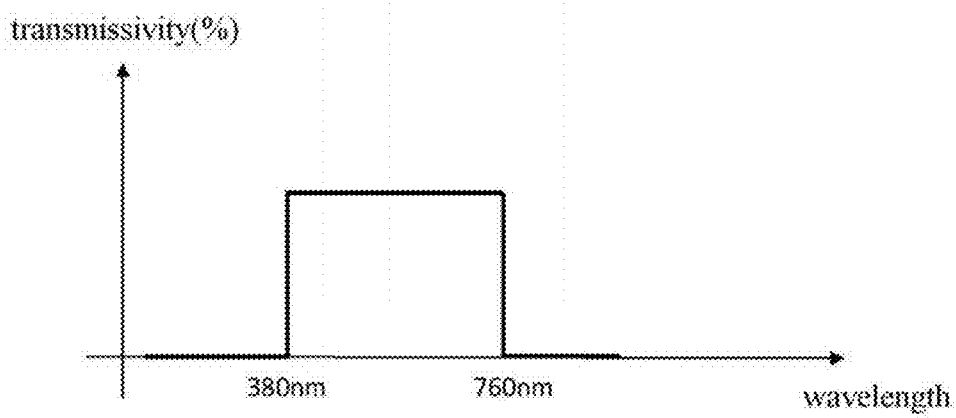
FIG. 9 is a spectral characteristic diagram of an infrared light bandpass filter in the optical filter assembly in an infrared light waveband (e.g. 780-880 nm)

FIG. 8 and FIG. 9 show spectral characteristics of the optical filter assembly 120 in a visible light waveband (e.g. 380-760 nm) and spectral characteristics of the optical filter assembly in an infrared light waveband (e.g. 780-880 nm).

According to one aspect of the present invention, during switching between the visible light imaging mode and the infrared light imaging mode, the composite imaging system 100 can perform, through software control, mapping corresponding to step length lookup tables pre-calculated for the two different modes, so as to realize fast focus under the two imaging mode of the composite imaging. Since the focal length of infrared imaging is shorter than the focal length of visible light imaging, compared to the visible light mode, the lens position in the infrared light imaging mode is closer to the eye axially.

Figure 10:
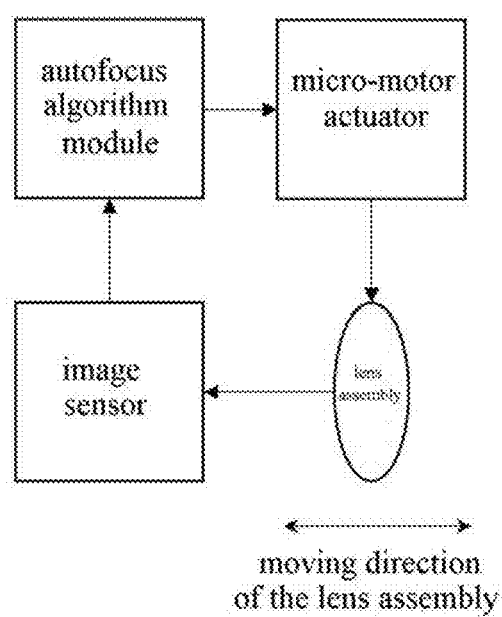
FIG. 10 is a schematic drawing of an autofocus imaging unit of the composite imaging system according to the present invention.

According to one aspect of the present invention, the composite imaging system 100 can particularly realize fast focus in the infrared light imaging mode. FIG. 10 is a schematic drawing of an autofocus unit of the composite imaging system according to the present invention. In addition to the above-mentioned image sensor, lens assembly and micro-motor actuator, said autofocus unit includes an autofocus algorithm module which can be implemented by a processor (not shown) or included in the processor. Specifically, when the composite imaging system of the present invention is in the infrared light imaging mode, the autofocus algorithm module uses specific physical properties of biological features from the image sensor as the image quality information to control the micro-motor actuator, thereby to autofocus the biological features in the region of interest. More specifically, based on said image quality information, the micro-motor actuator controls the motion component to move the lens assembly, so as to achieve autofocus of the biological features in the region of interest. Preferably, when the biological features include two eyes, the specific physical properties may include an interpupillary distance of the irises of the two eyes. Still preferably, when the biological features include one eye, the specific physical properties may include the iris outer circle diameter of said eye. In addition, the processor in the composite imaging system can also be configured to realize fast focus of the biological features by calculating in real time the specific physical properties of each frame of image generated by the image sensor and performing mapping corresponding to the pre-calculated step length lookup table.

According to one aspect of the present invention, the composite imaging system uses new specific physical properties which have relatively objective and constant values and are based on the biological features in the collected electronic images, obtains properties values of said specific physical properties in the electronic images as the image quality information of the electronic images, and adjusts the lens assembly according to the property values so as to achieve autofocus controlling of the biological features in the region of interest, thereby ensuring fast focus through software control during switching from the visible light imaging mode (with long focal length) to the infrared light imaging mode (with short focal length), improving the user experience and image quality of the collected biological features, and increasing recognition precision. As for details about the composite imaging system of the present invention realizing fast focus under the infrared light imaging mode, they will be further described in the method embodiment in the text below.

Figure 11:
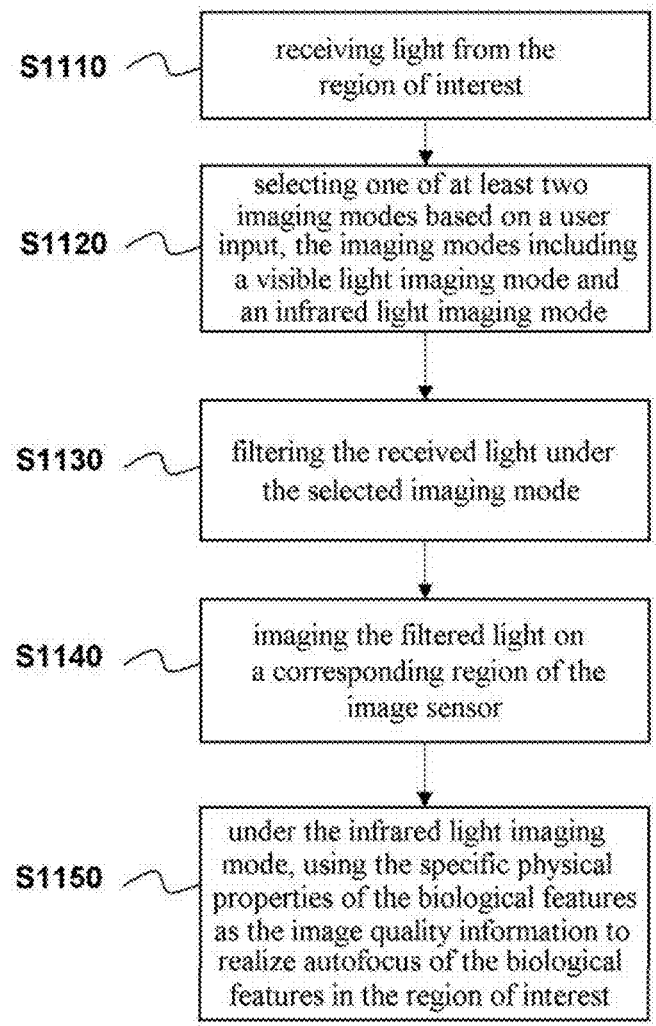
FIG. 11 is a flow chart of a composite imaging method according to the present invention.

The present invention further provides a composite imaging method, which can be implemented by the composite imaging system described above. FIG. 11 shows a flow chart of the composite imaging method according to the present invention. The method comprises: receiving light from the region of interest (S1110); selecting one of at least two imaging modes based on a user input, the imaging modes including a visible light imaging mode and an infrared light imaging mode (S1120); filtering the receiving light under the selected imaging mode (S1130); and imaging the filtered light on a corresponding region of the image sensor (S1140), wherein the passed visible light is imaged and output under the visible light imaging mode, and the passed infrared light is imaged and output under the infrared light imaging mode, and wherein the infrared light is from biological features. The image sensor can further output image data corresponding to the area of the image sensor pixel array to an encryption chip or a processor through a data transmission interface (e.g. an MIPI interface) for further processing. Furthermore, under the infrared light imaging mode, the specific physical properties of the biological features are used as the image quality information to realize autofocus of the biological features in the region of interest (S1150). In addition, the composite imaging method of the present invention further includes realizing fast focus of the biological features by calculating in real time the specific physical properties of each frame of image generated by the image sensor and performing mapping corresponding to the pre-calculated step length lookup table.

Specifically, the user switches the camera to enter into the visible light imaging mode or the infrared light imaging mode through software control. The image sensor (CMOS/CCD) chip includes the visible light imaging region and the infrared light imaging region according to the corresponding design specifications and area sizes of the visible light bandpass filter 121 and infrared light bandpass filter 122 in the optical filter assembly. Under the visible light imaging mode, the software controls the image signal processor (ISP) to select the corresponding visible light imaging region for operation and call the corresponding ISP parameter settings for visible light imaging so as to optimize the effect of visible light imaging. In particular, with respect to iris recognition, since there is an active infrared illumination and the illumination light source is stable, the ISP parameters need to be modified to reduce the gain of the image sensor CMOS, increase the contrast of the image sensor CMOS, reduce the noise of the image sensor CMOS, and increase the signal-to-noise ratio of the image sensor CMOS, thereby facilitating improving of the iris imaging quality. If the module has a zoom function, the micro-motor actuator can be used to control the motion component to move the lens assembly to enter into the visible light focus mode. Autofocus is achieved by a conventional focusing method (e.g. contrast focusing) that is based on image quality evaluation, and images with a resolution size of positions corresponding to the visible light imaging region and the output format thereof are output. If it is under the infrared light imaging mode, the ISP selects the corresponding infrared light imaging region for operation, and calls the corresponding ISP parameter settings for infrared light imaging so as to optimize the effect of infrared light imaging. If the module has a zoom function, the micro-motor actuator can be used to control the motion component to move the lens assembly to enter into the infrared light focus mode, meanwhile, images with a resolution size of positions corresponding to the infrared light imaging region and the output format thereof are output.

With a zoom function, the autofocus process under the infrared light mode is as follows: the imaging system obtains images of the biological features in the region of interest captured through the lens assembly, and then calculates quality information of the corresponding biological feature images with reference to the biological feature part in the images, the quality information including, but is not limited to, such specific physical properties as definition, contrast, average gray level, information entropy of image, interpupillary distance, pupil diameter, iris outer circle diameter, horizontal width of the corner of the eye, etc. Preferably, when the biological features include two eyes, the specific physical properties may include interpupillary distance of the irises of the two eyes. Still preferably, when the biological features include one eye, the specific physical properties may include the iris outer circle diameter of said eye. The calculated biological feature image quality information can be a set of image quality values, or a single image quality index. According to the obtained image quality information of the images, the system controls the micro-motor to change the position of the lens assembly so as to optimize the image quality calculated from the obtained images, thereby achieving autofocus controlling of the biological features in the region of interest. After finishing the infrared autofocus, the position of the lens will be closer to the eyes than in the visible light mode.

Figure 12:
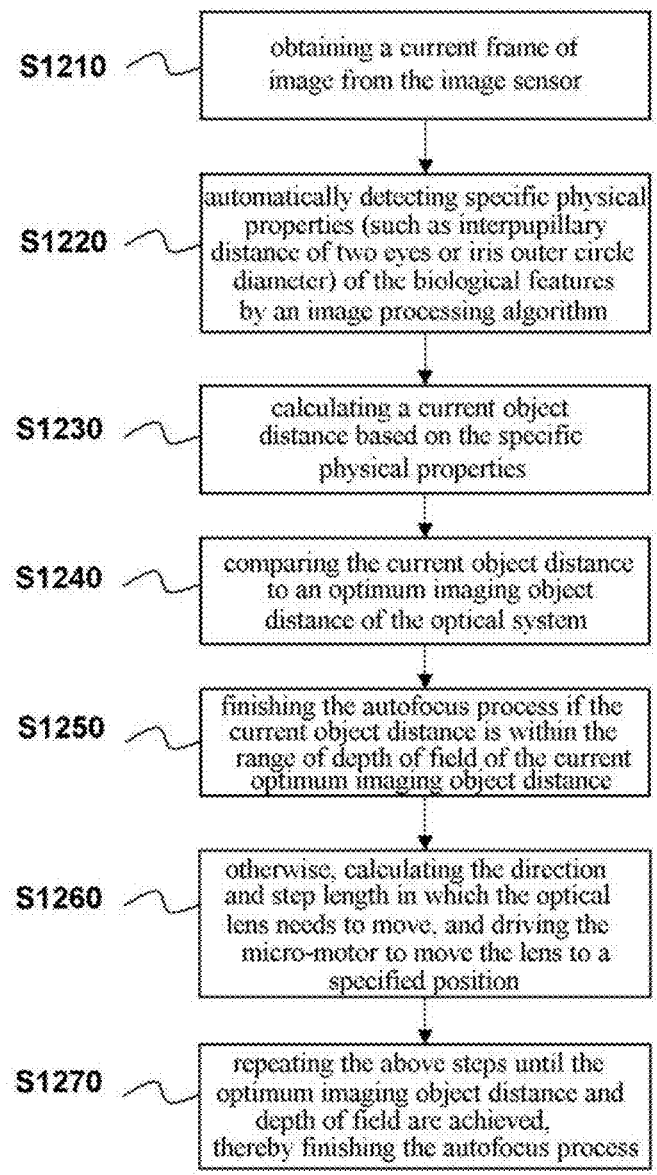
FIG. 12 is a flow chart of an autofocus algorithm under an infrared light imaging mode according to an embodiment of the present invention.

FIG. 12 is a flow chart of an autofocus algorithm under an infrared light imaging mode according to an embodiment of the present invention. First, a current frame of image is obtained from the image sensor (S1210). Then, specific physical properties (such as interpupillary distance of the eyes or iris outer circle diameter) of the biological features are automatically detected by an image processing algorithm (S1220). Next, a current object distance is calculated based on the detected specific physical properties (S1230), and the current object distance is compared to an optimum imaging object distance corresponding to the current focal length of the optical system (S1240). If the current object distance is within the range of depth of field of the current optimum imaging object distance, the autofocus process is finished (S1250). Otherwise, the direction and step length in which the lens assembly needs to move are calculated, and the micro-motor actuator is driven to move the lens assembly to a specified position (S1260). The above steps are repeated until the optimum imaging object distance and depth of field are achieved, thereby finishing the autofocus process (S1270).

Liveness detection is an important need in biological recognition, and it is also a difficult problem. Taking iris recognition as an example, currently, the iris recognition is generally realized under infrared light, so the liveness recognition in iris recognition is also performed in the infrared light environment. It is quite difficult to realize stable liveness recognition for different races (people with light color pupil or dark pupil) in various complex environments. According to one aspect of the present invention, the composite imaging system skillfully takes advantage of its double-spectrum imaging characteristics to realize the liveness detection function of biological recognition. The liveness detection function can be controlled and realized through a processor (not shown), or a functional module for realizing liveness detection can be included in the processor. Preferably, the composite imaging system comprises a liveness detection unit, which provides a function of detecting whether an obtained iris image is from a real person or a fake iris. The basic principle of the liveness detection unit is to make judgments of living body by means of the different optical reflection characteristics manifested by normal human biological tissue and material that makes up fake iris under the visible light and infrared light.

The composite imaging system, during imaging, can sequentially enter into the visible light imaging mode and the infrared light imaging mode through a camera module, and obtain the visible light images and near infrared images of the current human eyes successively. By analyzing differences of the double-spectrum images of the current human eyes, an improved liveness recognition solution can be obtained. Specifically, the imaging process of the composite imaging system can be described by a Lambertian reflection model. According to the Lambertian reflection law, when irradiated by a light source with a wavelength λ, an intensity of reflected light at a certain point $p=[x,y]^T$ on the surface of the imaged object can be represented as:

$$I_{r,\lambda}(p) = \alpha_\lambda(p) I_{s,\lambda}(p) \cos \theta(p)$$

wherein $I_{r,\lambda}(p)$ represents the intensity of the reflected light with the wavelength λ, $\alpha_\lambda(p)$ is the reflectivity of the substance when the wavelength is λ, $I_{s,\lambda}(p)$ represents the intensity of the incident light source with the wavelength λ, and θ(p) is the angle between a normal vector at point p on the surface of the object and a vector pointing from point p to the camera.

In the double-spectrum (i.e. visible light and infrared light) imaging mode, a reflectance ratio R(p) at point p on the surface of the object can be obtained as:

$$R(p) = \frac{\alpha_{\lambda_1}(p)}{\alpha_{\lambda_2}(p)} = \frac{I_{r,\lambda_1}(p)}{I_{r,\lambda_2}(p)} \cdot \frac{I_{s,\lambda_2}(p)}{I_{s,\lambda_1}(p)}$$

wherein $\lambda_1$ is the visible light wavelength, and $\lambda_2$ is the infrared light wavelength.

Assuming that the intensities of the incident light sources of visible light and infrared light are both uniformly distributed on the surface of the imaged object, the intensity $I_{s,\lambda_1}(p)$ of the incident light source of visible light can be approximated by the light source intensity measured by the mobile device's own light sensor, and the intensity $I_{s,\lambda_2}(p)$ of the incident light source of near infrared light can be obtained from the luminescent parameters of the mobile device's own near infrared light emitting device. Thus the reflectance ratio R(p) can be simplified as:

$$R(p) = k \cdot \frac{I_{r,\lambda_1}(p)}{I_{r,\lambda_2}(p)}$$

wherein k is a positive constant.

The intensities $I_{s,\lambda_1}(p)$ and $I_{s,\lambda_2}(p)$ of reflected visible light and infrared light at point p can be obtained from pixel gray values corresponding to point p in the collected visible light and infrared light images. Thus corresponding reflectance ratio images can be calculated from the collected visible light and infrared light images as:

$$R = k \cdot \frac{P}{Q}$$

wherein R is the reflectance ratio image, k is a positive constant, P is the collected visible light image, and Q is the collected infrared light image.

Figure 13:
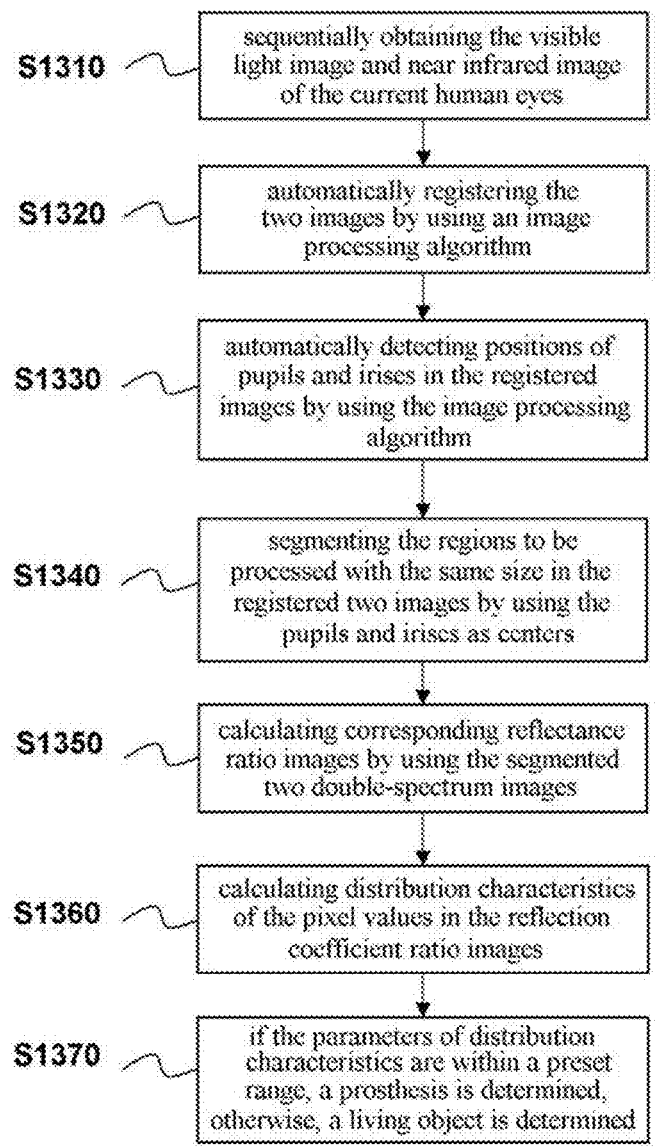
FIG. 13 is a flow chart of a double-spectrum liveness detection process in a composite imaging system.

FIG. 13 is a flow chart of a double-spectrum liveness detection process in the composite imaging system. Specifically, taking iris recognition as an example, specific steps of the liveness detection process can be described as follows: the liveness detection unit controls the imaging system to sequentially enter into the visible light imaging mode and the infrared light imaging mode (S1310) and obtain the visible light images and near infrared images of the current human eyes sequentially. Wherein, during image collection, a fixed collection distance and a stable collection angle are maintained as possible by means of the design of a user man-machine interface. After obtaining the visible light and infrared light images of the same human eye, double-spectrum images are automatically registered by using an image processing algorithm (S1320), positions of pupils and irises are automatically detected in the registered images by using the image processing algorithm (S1330), and the same regions to be processed are segmented by using the detected pupils and irises as center (S1340). Then, corresponding reflectance ratio images are calculated using the segmented double-spectrum images (S1350), and distribution characteristics of the reflectance ratio (e.g. parameters like histogram, gradient, variance) are analyzed (S1360). If the parameters of distribution characteristics of the reflectance ratio are within a preset range, it is determined that the current human eye is a prosthesis or a fake iris, otherwise, it is determined that the current human eye is a living object (S1370). The above mentioned method makes use of information of the two spectrums of visible light and infrared light and proposes a liveness detection algorithm using an inventive composite calculation, so it can realize stable and more robust liveness detection and recognition for different races (light color pupil and dark pupil) in various complex environments.

According to one aspect of the present invention, the composite imaging system further comprises an image encryption unit to provide the function of encrypting the obtained images of biological features. The image encryption unit can be implemented by a processor (not shown) or included in the processor, or it can be included in the image sensor or a module of the composite imaging system as an independent module unit. It shall be noted that the image encryption unit can be implemented together with the above-described autofocus unit in the same processor, or they can be implemented by different processors, respectively. The image encryption unit works as follows: after the software controls the composite imaging system to enter into the infrared light imaging mode and obtain infrared images, the image encryption function is enabled to encrypt the obtained images of biological features, and the encrypted data are output for further processing. When the composite imaging system is controlled by the software to enter into the visible light imaging mode, the image encryption unit will not be enabled, and the obtained visible light images will not encrypted, instead, they are directly output.

Figure 14:
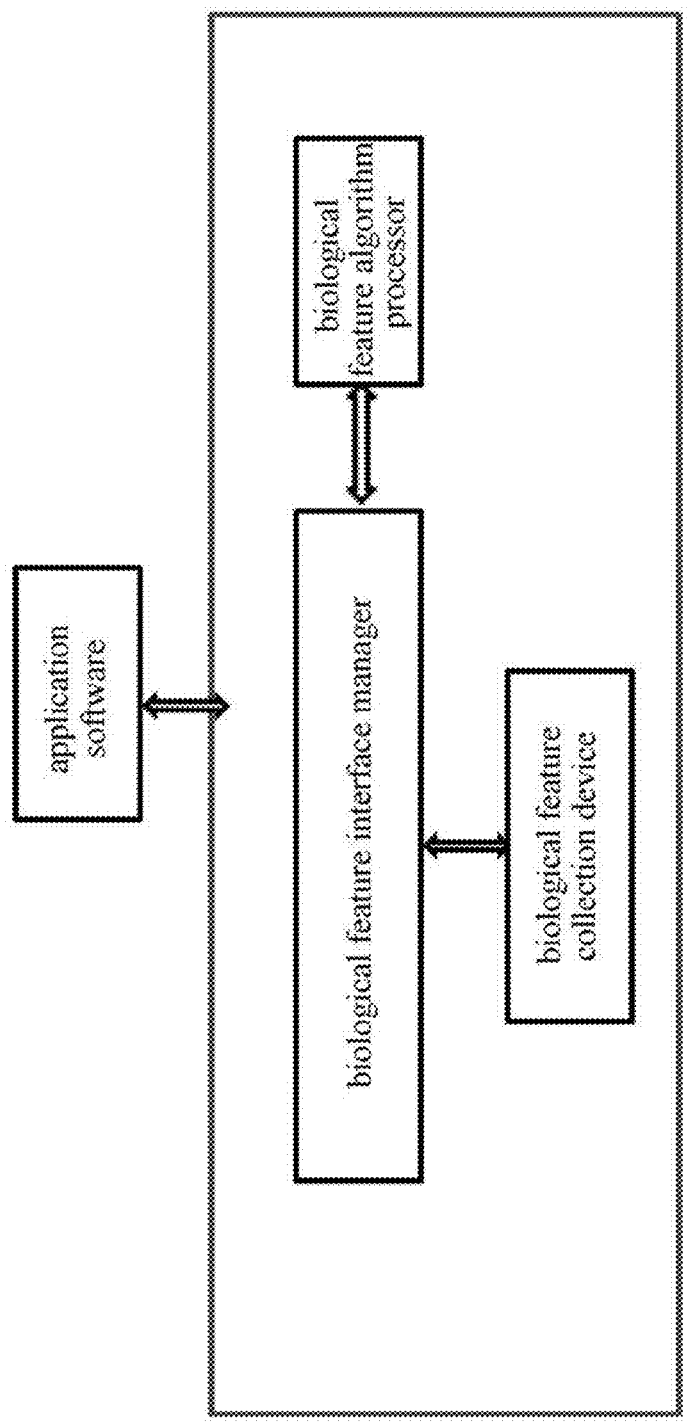
FIG. 14 is a schematic drawing of a unified programmable biological feature recognition software architecture according to the present invention.

FIG. 14 is a schematic drawing of a unified programmable biological feature recognition software architecture according to the present invention, which can be embodied in the composite imaging system according to the present invention. Taking iris recognition as an example, said unified programmable biological feature recognition software architecture should meet the following goals:

1. the unified software architecture can enable easier integration of sensors from different manufacturers;
2. the unified interface makes it unnecessary for application developers to consider interaction between the biological feature recognition algorithm and the iris collector;
3. different operating systems (Windows, Android, iOS or other systems) are supported across platforms;
4. special requirements of applications can be easily met through extension interfaces.

Figure 15:
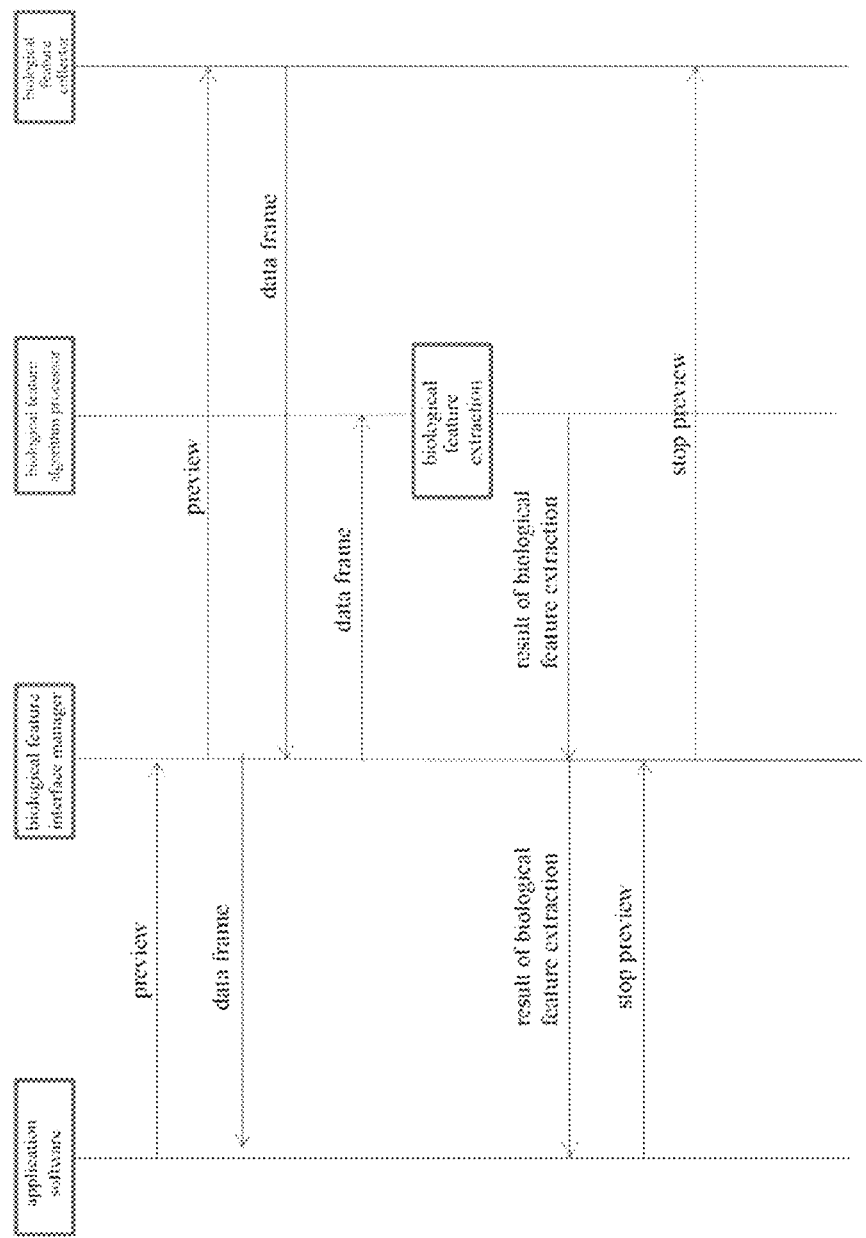
FIG. 15 is a schematic drawing showing a data flow of the software architecture as shown in FIG. 14.

Taking iris recognition as an example, the software architecture shown in FIG. 14 includes: a biological feature interface manager for providing a third party developer with a biological feature recognition interface; a biological feature algorithm processor for processing data computation related to the biological feature information; a biological feature collecting device for collecting biological feature information. Said software architecture can interact with other application software. FIG. 15 is a schematic drawing showing a data flow of the software architecture as shown in FIG. 14. Specifically, FIG. 15 shows transfer of data frames and commands among the biological feature interface manager, the biological feature algorithm processor, the biological feature collecting device and the application.

FIGS. 16a-16c and FIGS. 17a-17c are schematic drawings of two innovative implementations of a mobile terminal comprising the composite imaging system of the present invention. Said mobile terminal uses one or more infrared LEDs having a waveband in the range of 780-880 nm as a light source, and comprises a composite imaging camera module, which is coupled to the composite imaging system according to the present invention.

Figure 16A:
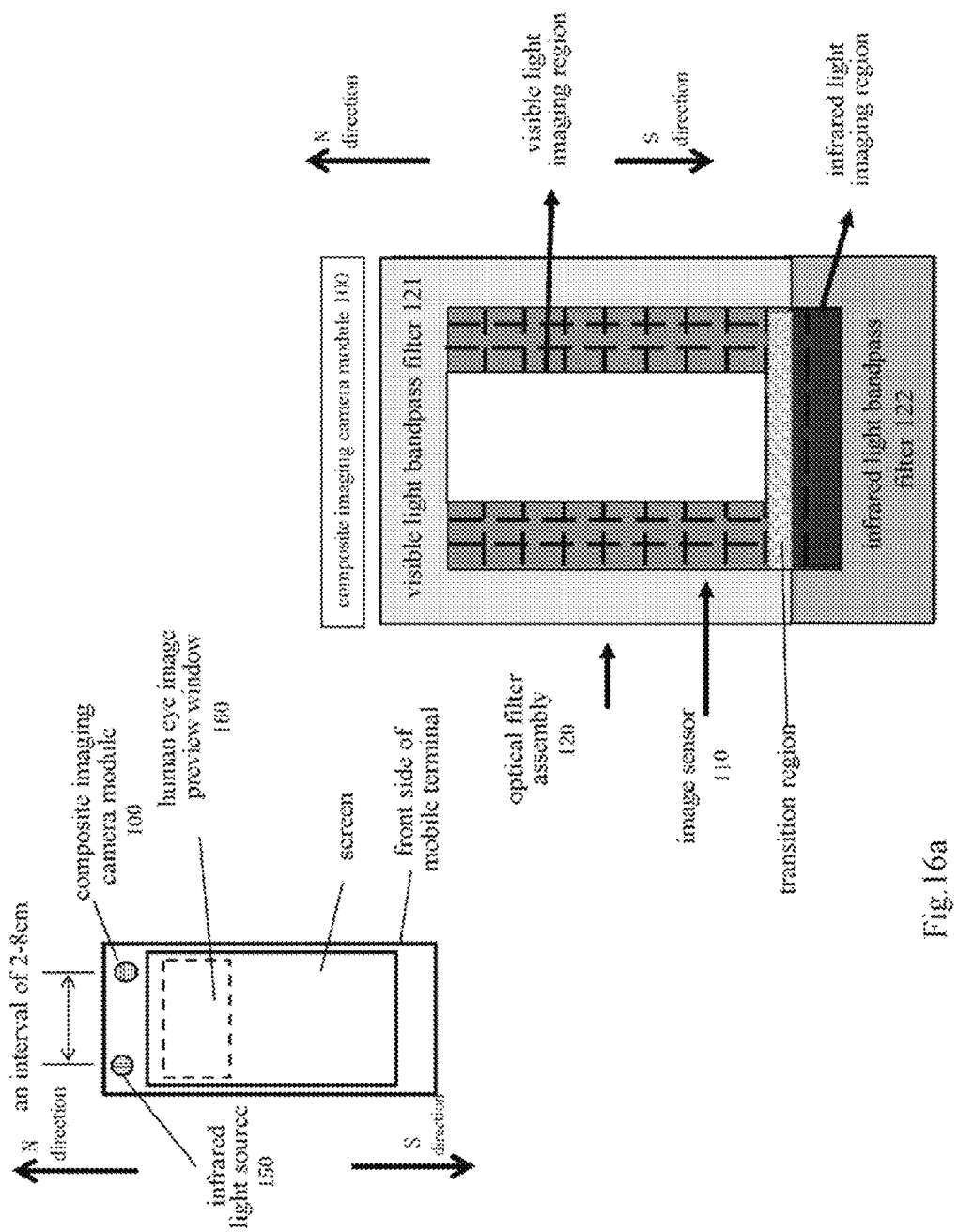
Figure 16B:
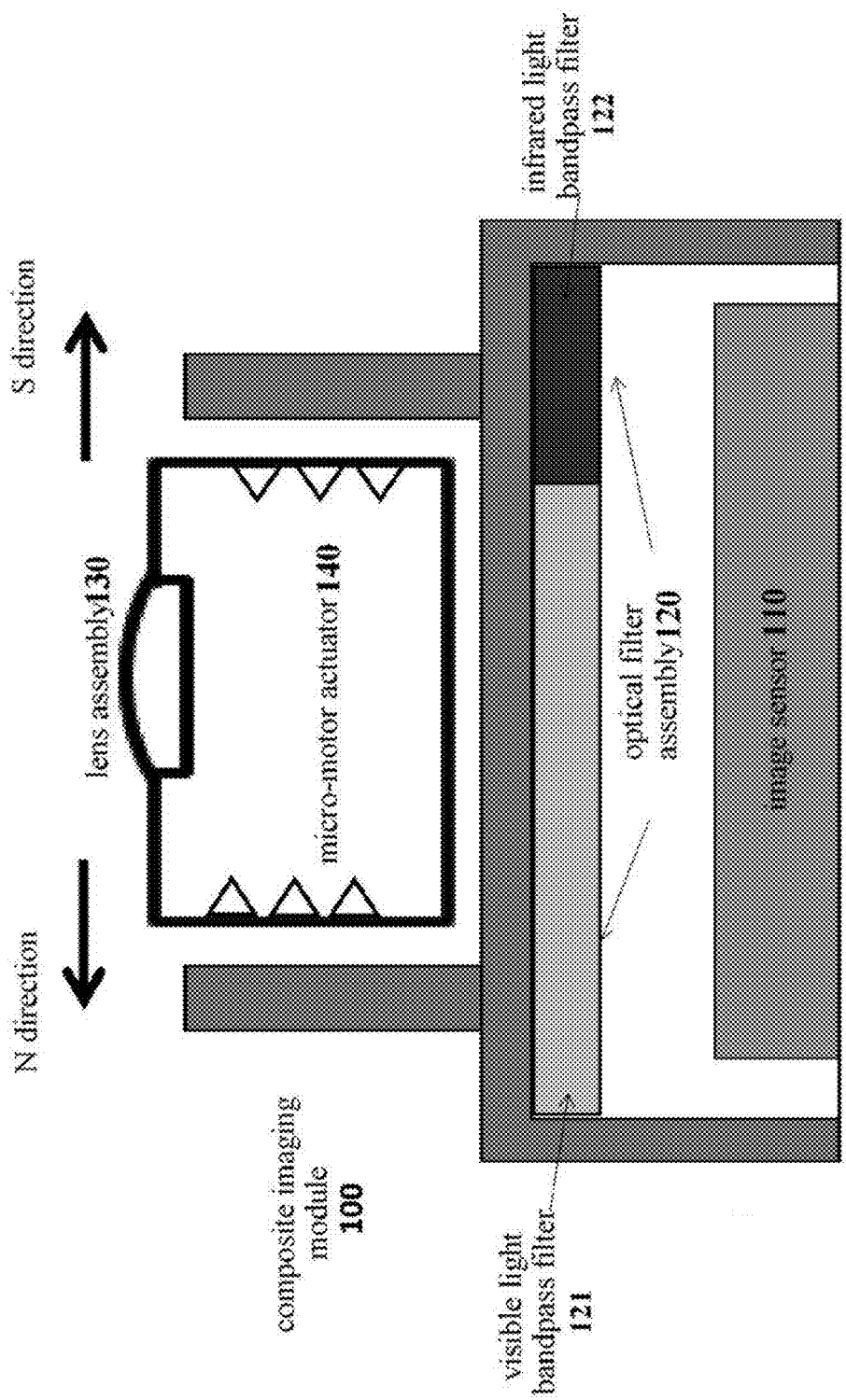
Figure 16C:
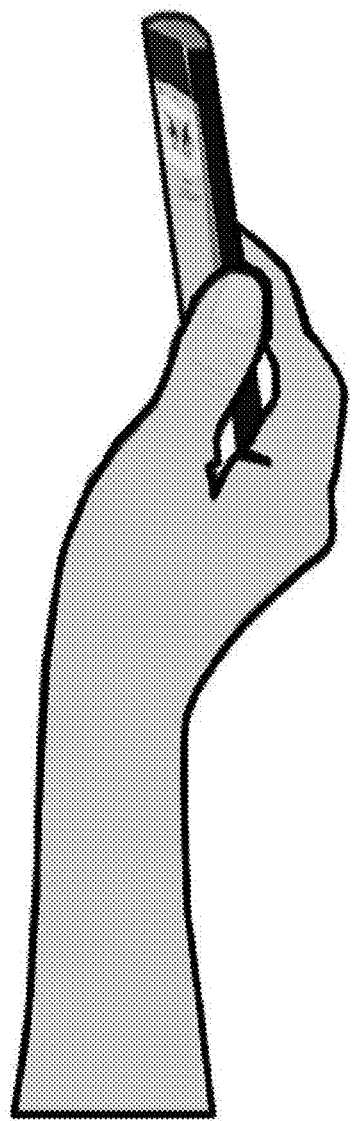

FIGS. 16a-16c show a preferred embodiment of a mobile terminal comprising the composite imaging system of the present invention, wherein FIGS. 16a and 16b show the structural configuration of the mobile terminal, and FIG. 16c shows the user experience when the mobile terminal is in use. In this embodiment, the composite imaging system that is implemented as a composite imaging camera module 100 is arranged on a side of the front of the screen of the mobile terminal (such as at the top or bottom of the screen, and it is at the top of the screen in this embodiment). In this embodiment, an infrared light source 150 (e.g. an infrared light-emitting diode (LED)) and the composite imaging camera module 100 are arranged on the same side of the front of the screen of the mobile terminal, wherein a horizontal distance from the position of the infrared light source 150 to the center of the composite imaging camera module 100 is within a range of 2-8 cm, which can facilitate eliminating of the reflected light spots when being used by a user wearing glasses. The infrared light source 150 may consist of one or more infrared LEDs whose central wavelengths are within the range of 780-880 nm. If the composite imaging camera module 100 being placed at the top of the screen of the mobile terminal is considered as the reference coordinate, i.e. the module 100 is at direction N of the screen, and the screen is at direction S (which is opposite to direction N) of the module, then in this embodiment, the optical filter assembly and the image sensor are configured as follows: wherein the visible light bandpass filter 121 is placed above (at direction N of) the infrared light bandpass filter 122, and the visible light imaging region of the corresponding image sensor is placed above (at direction N of) the infrared light imaging region. In this embodiment, the area of the visible light imaging region is greater than 50% of the area of the image sensor, and the area of the infrared light imaging region is smaller than 50% of the area of the image sensor, the transition region is located between the visible light imaging region and the infrared light imaging region, and its area is smaller than 15% of the area of the image sensor. Since the 3D structure of the mobile terminal includes a length direction, a width direction and a thickness direction, so the above configuration can also be described as follow: the composite imaging camera module 100 and the infrared light source 150 are at the upper part of the screen along the length direction of the mobile terminal; the visible light bandpass filter 121 is placed above the infrared light bandpass filter 122 along the length direction of the mobile terminal; and the visible light imaging region of the image sensor is placed above the infrared light imaging region along the length direction of the mobile terminal, and the transition region is located between the visible light imaging region and the infrared light imaging region. In addition, when the infrared light imaging mode is activated, an eye image preview window 160 can be provided on the screen. Said eye image preview window 160 only outputs images of the corresponding infrared light imaging region (i.e. biological feature imaging) to guide the user to cooperate in collecting biological feature images. When it is in use, the position of the eye image preview window 160 can be placed on the screen of the mobile terminal near the upper side or lower side of the screen. In this embodiment, as shown in FIG. 16a, the eye image preview window 160 is at the upper part (i.e. direction N) of the screen area along the length direction of the mobile terminal, i.e. at the side close to the composite imaging camera module 100, which can facilitate bringing the user's eyes to gaze at the direction of the composite imaging camera when it is in use, thus reducing occlusion by eyelids and eyelashes, so that better quality iris images can be obtained to facilitate recognition.

In the embodiment shown by FIGS. 16a-16c, under the circumstance of the above-mentioned configuration, when the mobile terminal is in use and enters into the infrared light imaging mode to perform infrared imaging of the biological features (e.g. entering into the iris recognition mode), the eye image preview window 160 is provided at the upper part of the screen of the mobile terminal, said eye image preview window 160 previews and outputs the infrared light imaging region of the image sensor so as to guide the user, as shown in FIG. 16a. At this time, as shown in FIG. 16c, the user can bring the upper part (i.e. the side including the composite imaging camera module 100) of the mobile terminal to tilt towards the user, so that when the user gazes at the eye image preview window 160, images of two eyes can be output in said eye image preview window 160, thus biological feature images (e.g. iris images) can be collected for subsequent pre-processing or encrypted recognition process. Specifically, the composite imaging camera module 100 collects visible light and infrared light from the biological features. According to the pinhole camera model, the infrared light from the biological features enters into the interior of the mobile terminal through the composite imaging camera module 100 and passes through the infrared light bandpass filter 122 that is at the lower part along the length direction of the mobile terminal to arrive at the infrared light imaging region of the image sensor that is also at the lower part, thereby performing infrared light imaging of the biological features. In the configuration in the present embodiment, placing the infrared light source 150 at the top of the mobile terminal can also help to more fully illuminate the biological features when the upper part of the mobile terminal is tilting towards the user, such that the energy of the infrared light source 150 can mainly illuminate the biological features (e.g. iris) of the user when performing biological feature recognition.

Figure 17A:
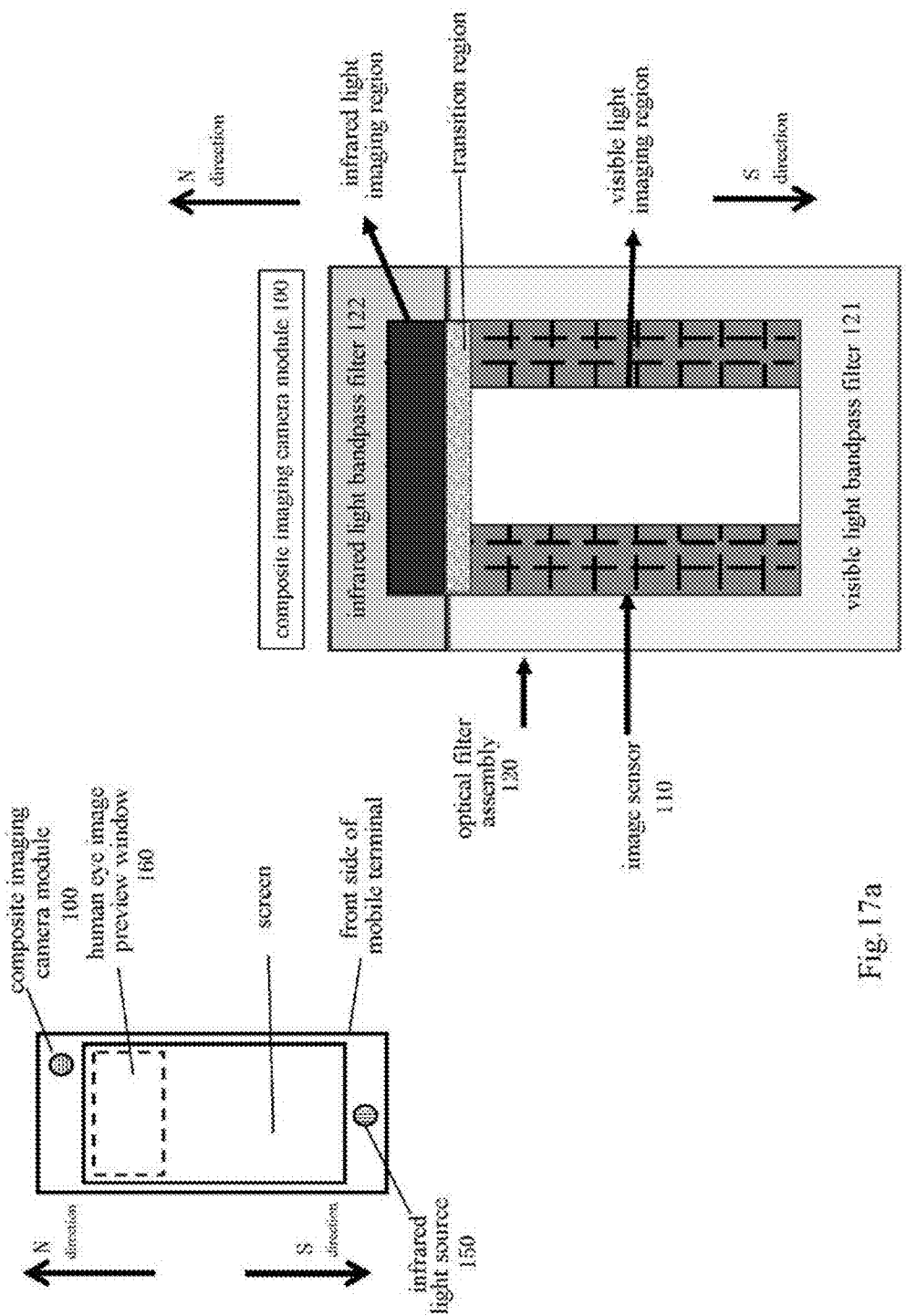
Figure 17B:
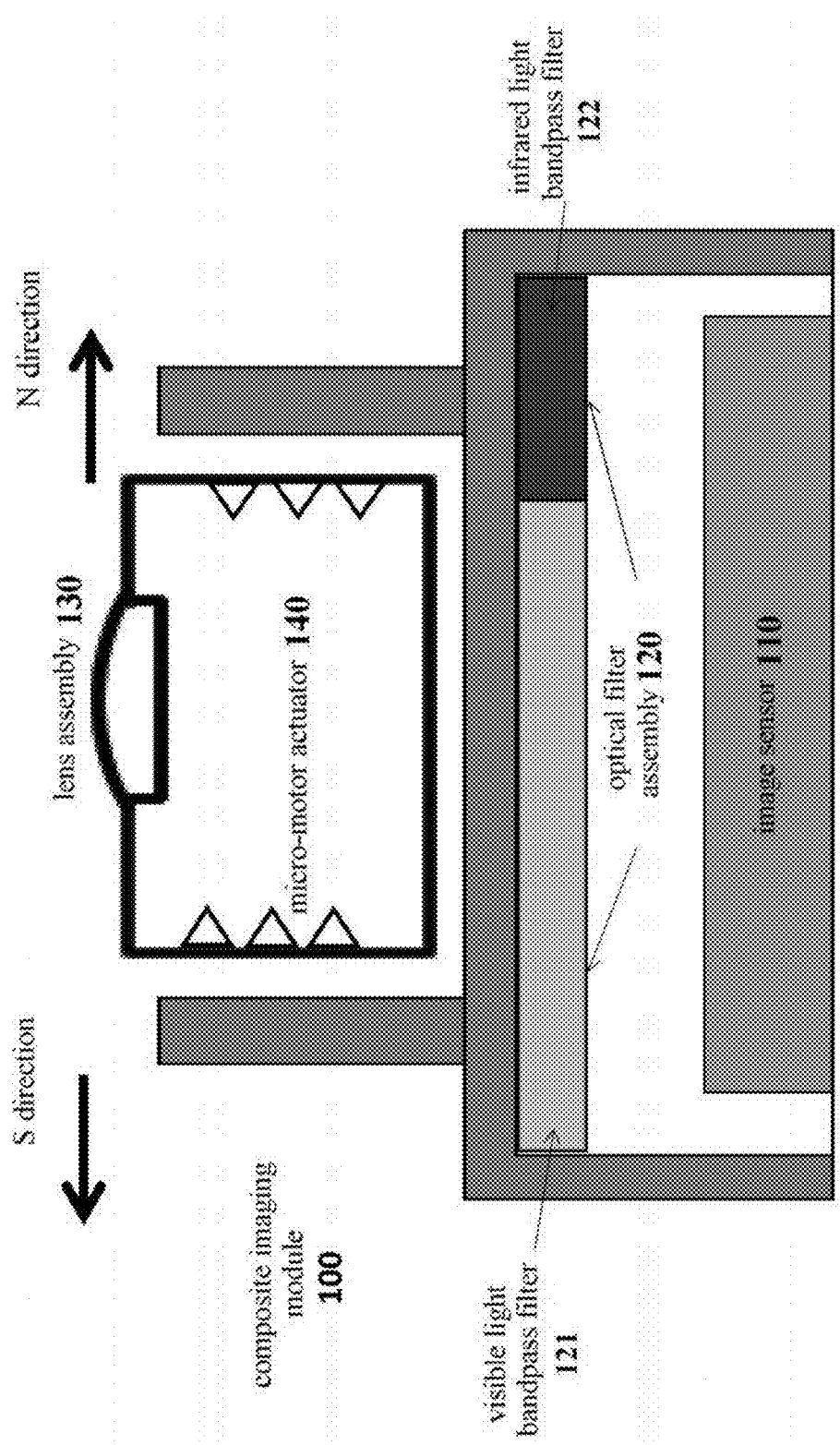
Figure 17C:
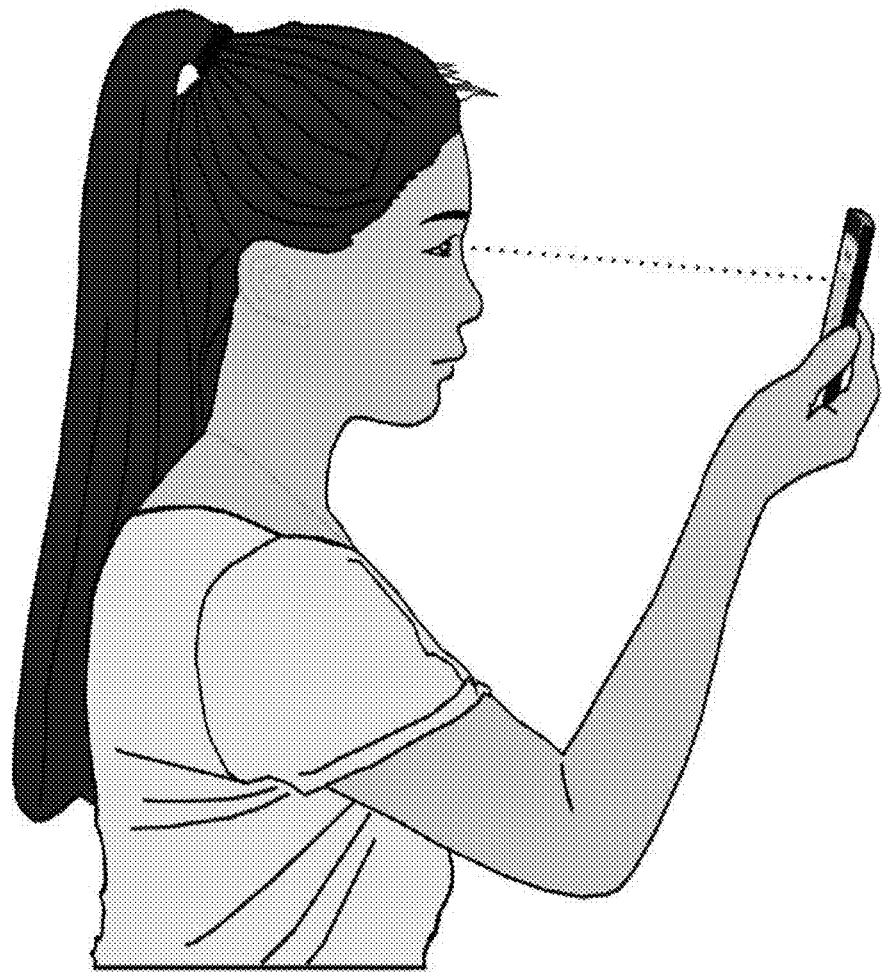

FIGS. 17a-17c show another preferred embodiment of a mobile terminal comprising the composite imaging system of the present invention. Compared to the embodiment of FIGS. 16a-16c, in the embodiment of FIGS. 17a-17c, the infrared light source 150 is at the lower part (i.e. direction S) of the screen along the length direction of the mobile terminal, the visible light bandpass filter 121 is placed under the infrared light bandpass filter 122 along the length direction of the mobile terminal; and the visible light imaging region of the image sensor is placed under the infrared light imaging region along the length direction of the mobile terminal, and the transition region is located between the visible light imaging region and the infrared light imaging region. Similar to the embodiment of FIGS. 16a-16c, when the mobile terminal is in use and enters into the infrared light imaging mode to perform infrared imaging of the biological features (e.g. entering into the iris recognition mode), the eye image preview window 160 is provided at the upper part (i.e. direction N) of the screen area of the mobile terminal, said eye image preview window 160 previews and outputs the infrared light imaging region of the image sensor so as to guide the user, as shown in FIG. 17a. Said eye image preview window 160 is located at the upper part (i.e. direction N) of the screen area along the length direction of the mobile terminal, i.e. at the side close to the composite imaging camera module 100, which can facilitate bringing the user's eyes to gaze at the direction of the composite imaging camera during iris recognition, thus reducing occlusion of iris by upper eyelids and eyelashes, so that better quality iris images can be obtained to facilitate recognition. At this time, as shown in FIG. 17c, the user can bring the upper part (i.e. the side including the composite imaging camera module 100) of the mobile terminal to tilt away from the user, so that when the user gazes at the eye image preview window 160, the software is used to perform translation control so as to ensure that the preview images in said eye image preview window 160 are previews of the infrared light imaging region of the image sensor, such that images of two eyes of the user can be output in said eye image preview window 160, thus biological feature images (e.g. iris images) can be collected for subsequent pre-processing or encrypted recognition process. In the configuration in the present embodiment, if the preview window is placed at the lower part of the screen area of the mobile terminal, then the iris textures may be occluded more by upper eyelids and eyelashes, so such a configuration is not preferred in the present invention. In the configuration in the present embodiment, placing the infrared light source 150 under the mobile terminal can help to more fully illuminate the biological features when the upper part of the mobile terminal is tilting away from the user and the user is holding the mobile terminal in hand for biological recognition, such that the energy of the infrared light source 150 can mainly illuminate the biological features (e.g. iris) of the user when performing biological feature recognition.

In the composite imaging system or mobile terminal of the present invention, if the image sensor uses the CMOS image sensor of 13M (4680(W)×3456(H)), the height of the visible light part is greater than 50% of the height of the entire image sensor (1728 pixels), and the height of the infrared light part is smaller than 50% of the height of the entire image sensor (less than 1728 pixels).

The optical filter is placed between the optical lens and the image sensor, and the width and height thereof are slightly larger than those of the image sensor. The region of the optical filter that the visible light and infrared light can pass through is slightly larger than the corresponding region of the image sensor, so that it can completely cover said region of the image sensor.

According to a preferred embodiment, the image sensor uses a CMOS image sensor with a high resolution, wherein the image resolution in the horizontal direction is above 2400 pixels. For a mobile terminal (especially a mobile phone), one of the important functions of the front-facing camera is selfie, and selfie camera typically has a wide angle lens (diagonal FoV of the lens is generally around 70-80 degrees), while iris recognition requires high resolution imaging of small objects such as the eye, which requires a lens with narrow FoV, so there are conflicting requirements in lens design for both applications. In order to be able to achieve both the function of selfie and the function of iris recognition by multiplexing of one lens with large FoV, the resolution of image sensor needs to be increased. For example, according to the ISO standard, the iris outer circle diameter of one eye needs to have 120 pixels, and in order to be able to use a lens with FoV_H (FoV in the horizontal direction) of about 59 degrees to perform iris recognition at a distance of 30 cm, the imaging chip needs to have at least 3200 pixels in the horizontal direction, which corresponds to a CMOS image sensor of 8M (assume that the sensor's aspect ratio is 4:3). If a CMOS sensor of 13M is used, the FoV of the lens can be smaller. Therefore, in a further preferred embodiment, the image sensor uses the CMOS image sensor of 13M (4680(W)×3456(H)). The visible light and infrared light imaging regions in the image sensor can preferably be designed as follows: the height of the visible light imaging region is 80% of the height of the entire image sensor (2756 pixels), and the height of the infrared light imaging region is 20% of the height of the entire image sensor (700 pixels).

In addition, an auxiliary infrared light source can be added into the front-facing display screen of the mobile terminal, which can generate an infrared light source. When the mobile terminal is in the infrared light imaging mode, said auxiliary infrared light source can provide auxiliary infrared light illumination to the biological features, thus saving power of the main infrared light source provided on the mobile terminal. Local infrared screen parts on the screen are ignited to illuminate the irises of the human eyes with the switch of software. Subsequently, an OLED light source can be used to illuminate the screen. In addition, if the camera is at the upper part of the screen, then the image sensor can be defined as the infrared light part being above the visible light part.

The composite imaging system and method of the present invention may have the following advantages:

1) A single camera can realize composite imaging of visible light and infrared light, thus simplifying hardware design, and no motion component is used for switching the optical filters, thus greatly improving stability, and switching between the visible light imaging and infrared light imaging can be realized purely by software.

2) The composite imaging system and method of the present invention can ensure normal use of the front-facing camera of the mobile device, such as selfie, meanwhile, infrared biological feature images that meet the requirements for biological feature (e.g. iris) recognition can be collected at the distance of normal use by the user (such as 20-50 cm), thus the user experience will not be affected.

3) Infrared light imaging in different regions requires only certain regions of the image sensor, instead of the entire image sensor, to receive illumination from the infrared light source, thus reducing total power consumption of the infrared illumination light source needed by the image sensor, i.e. the infrared LED light source with low power and small emission angle can also ensure that the infrared region can absorb sufficient infrared spectral energy so as to obtain biological feature images with rich texture details.

4) The composite imaging system and method of the present invention uses the near infrared focusing algorithm that is automatic, fast and effective and that is based on the biological feature information, thus ensuring a fast focal length correction when switching from the visible light long focal length mode to the infrared light short focal length mode by software, and this can facilitate improving the quality of the obtained near infrared biological feature images.

5) The composite imaging system and method of the present invention can image the visible light part and the infrared light part through one camera module during imaging; and by analyzing differences between the visible light images and the infrared light images, an improved solution for liveness recognition can be obtained.

6) The composite imaging system and method of the present invention can encrypt the obtained biological feature images, thus ensuring safety of personal sensitive information of the user. The encryption method of the present invention selectively encrypts images on the basis of image quality judgments, thus effectively reducing the requirement on data processing throughput of the encryption chip and ensuring that the images are encrypted in real time. In addition, in the encryption method of the present invention, images for preview are output after being down-sampled, which can correctly guide the user to collect the biological feature recognition images and will not affect the user experience. Since the down-sampled preview images do not contain biological feature information with sufficient details, leakage of personal sensitive information of the user may not happen.

The composite imaging system and method with multiplexing of the imaging functions of the present invention is described by using iris recognition as an example. However, various aspects of the present invention are not limited to recognition of the iris of human eyes, they can also be applied to other biological features, such as sclera, fingerprint, retina, nose, face (2D or 3D), eyeprint, lip lines and vein, for identity recognition.

The terms used herein are only for described specific embodiments, and do not intend to limit the present invention. As used herein, the singular forms "a" and "this" also intend to include the plural forms unless clearly indicated otherwise in the context. It shall also be appreciated that the term "comprise" or "include" used herein specifies the appearance of the stated feature, entirety, step, operation, element and/or assembly, but it does not mean to exclude the appearance or addition of one or more other features, entireties, steps, operations, elements, assemblies and/or the groups thereof.

Unless otherwise defined, the terms (including technical terms and scientific terms) used herein have the same meaning as that commonly understood by the ordinarily skilled person in the art of the present invention. The terms used herein shall be interpreted as having the same meaning as that in the context of this specification and in the related fields, and shall not be interpreted ideally or too formally, unless they are specifically defined so herein.

Although some embodiments have been described in detail in the above text, other modifications are possible. For example, in order to achieve the expected result, the logical procedures illustrated in the drawings may not necessarily be in the shown specific sequence or successive sequence. Other steps may be provided, or some steps may be removed from the described flows, and other components can be added to the described system or assemblies can be removed from the described system. Other embodiments may fall within the scope of the appended claims.

The invention claimed is:

1. A biological feature composite imaging system with multiplexing of imaging functions, comprising:
    a lens assembly for receiving light from a region of interest;
    an optical filter assembly for filtering the received light so as to image light with a waveband for which passage is allowed, the optical filter assembly including at least a visible light bandpass region that allows only the visible light to pass through the optical filter assembly and an infrared light bandpass region that allows only the infrared light to pass through the optical filter assembly;
    an image sensor that includes a visible light imaging region, an infrared light imaging region, and a transition region between said two regions, said image sensor operating under one of the visible light imaging mode and the infrared light imaging mode, wherein the visible light imaging region images the visible light passing through the visible light bandpass region under the visible light imaging mode, and the infrared light imaging region images the infrared light passing through the infrared bandpass region under the infrared light imaging mode, wherein the infrared light is from biological features;

wherein under the infrared light imaging mode, specific physical properties of the biological features are used as the image quality information to realize auto-focus of the biological features in the region of interest.

2. The composite imaging system according to claim 1, further comprising:
a motion component for adjusting movement of the lens assembly, and
a micro-motor actuator for controlling the motion component under any imaging mode to move the lens assembly, so as to adjust a focal length of the lens assembly,
wherein the autofocus includes using the micro-motor actuator to control the motion component to move the lens assembly by using the specific physical properties of the biological features as the image quality information, thereby realizing autofocus of the biological features in the region of interest.

3. The composite imaging system according to claim 1, further comprising:
an image encryption unit for encrypting images generated by the image sensor.

4. The composite imaging system according to claim 3, wherein
after the infrared light images are generated by the image sensor under the infrared light imaging mode, the image encryption unit encrypts the obtained infrared light images of the biological features and outputs encrypted images for further processing; and
under the visible light imaging mode, the image encryption unit does not encrypt the visible light images generated by the image sensor, but directly outputs the generated visible light image.

5. The composite imaging system according to claim 1, wherein
the area of the optical filter assembly is larger than the area of the image sensor.

6. The composite imaging system according to claim 1, wherein
the image sensor is a high resolution CMOS image sensor, and an image resolution of said high resolution CMOS image sensor in the horizontal direction is above 2400 pixels.

7. The composite imaging system according to claim 1, wherein
the composite imaging system includes a color filter corresponding to the visible light imaging region of the image sensor but does not include any color filter corresponding to the infrared light imaging region of the image sensor.

8. The composite imaging system according to claim 1, wherein
when the biological features include two eyes, the specific physical properties include an interpupillary distance of the irises of the two eyes.

9. The composite imaging system according to claim 1, wherein
when the biological features include one eye, the specific physical properties include an iris outer circle diameter of said eye.

10. The composite imaging system according to claim 1, wherein when switching between the visible light imaging mode and the infrared light imaging mode is controlled by software, mapping is performed corresponding to step length lookup tables pre-calculated for the visible light imaging mode and the infrared light imaging mode, so as to realize fast focusing under the visible light imaging mode and the infrared light imaging mode, wherein compared to the visible light imaging mode, the lens assembly position in the infrared light imaging mode is closer to the eye axially;
the autofocus under the infrared light imaging mode further comprises calculating in real time the specific physical properties of each frame of image generated by the image sensor and performing mapping corresponding to the pre-calculated step length lookup tables, so as to realize fast focusing of the biological feature.

11. The composite imaging system according to claim 1, further comprising:
a liveness detection unit, which is configured to perform a liveness detection, the liveness detection including detecting whether an image generated by the image sensor is from a real person or from a fake biological feature.

12. The composite imaging system according to claim 1, wherein
the liveness detection further comprises calculating for the visible light image and infrared light image generated by the image sensor to obtain a reflectance ratio value, and if the reflectance ratio value is within a preset range, it is determined that the generated image is from a prosthesis or a fake biological feature, otherwise, it is determined that the generated image is from a real person or from the biological feature of a living object.

13. A biological feature composite imaging method with multiplexing of imaging functions, comprising:
receiving light from a region of interest;
selecting one of at least two imaging modes based on a user input, said imaging modes including a visible light imaging mode and an infrared light imaging mode;
filtering the received light under the selected imaging mode, wherein the visible light is to be passed under the visible light imaging mode, and the infrared light is to be passed the infrared light imaging mode; and
imaging the filtered light on a corresponding region of an image sensor, wherein the passed visible light is imaged and output under the visible light imaging mode, and the passed infrared light is imaged and output under the infrared light imaging mode, wherein the infrared light is from biological features;
wherein under the infrared light imaging mode, specific physical properties of the biological features are used as the image quality information to realize auto-focus of the biological features in the region of interest.

14. The composite imaging method according to claim 13, wherein
when the biological features include two eyes, the specific physical properties include an interpupillary distance of the irises of the two eyes.

15. The composite imaging method according to claim 13, wherein
when the biological features include one eye, the specific physical properties include an iris outer circle diameter of said eye.

16. The composite imaging method according to claim 13, wherein when switching between the visible light imaging mode and the infrared light imaging mode is controlled by software, mapping is performed corresponding to step length lookup tables pre-calculated for the visible light imaging mode and the infrared light imaging mode, so as to realize fast focusing under the visible light imaging mode and the infrared light imaging mode;

the autofocus under the infrared light imaging mode further comprises calculating in real time the specific physical properties of each frame of image generated by the image sensor and performing mapping corresponding to the pre-calculated step length lookup tables, so as to realize fast focusing of the biological feature.

17. The composite imaging method according to claim 13, further comprising:

encrypting images generated by the image sensor.

18. The composite imaging method according to claim 17, wherein the encryption further comprises:

after generating infrared light images by the image sensor under the infrared light imaging mode, encrypting the obtained infrared light images of the biological features and outputting encrypted images for further processing; and under the visible light imaging mode, not encrypting the visible light images generated by the image sensor, but directly outputting the generated visible light image.

19. The composite imaging method according to claim 13, further comprising:

performing a liveness detection on images generated by the image sensor, the liveness detection including detecting whether images generated by the image sensor are from a real person or from a fake biological feature.

20. The composite imaging method according to claim 19, wherein the liveness detection further comprises calculating for the visible light image and infrared light image generated by the image sensor to obtain a reflectance ratio value, and if the reflectance ratio value is within a preset range, it is determined that the generated image is from a prosthesis or a fake biological feature, otherwise, it is determined that the generated image is from a real person or from the biological feature of a living object.

21. A mobile terminal for biological feature composite imaging, comprising:

an infrared light source for emitting infrared light to biological features;

a screen for displaying images and providing an eye image preview window that guides a user to cooperate in collecting biological feature images, said eye image preview window being at an upper part of the screen area along the length direction of the mobile terminal;

a composite imaging camera module, which further comprises:

a lens assembly for receiving light from a region of interest;

an optical filter assembly for filtering the received light so as to image light with a waveband for which passage is allowed, the optical filter assembly including at least a visible light bandpass region that allows only the visible light to pass through the optical filter assembly and an infrared light bandpass region that allows only the infrared light to pass through the optical filter assembly;

an image sensor which includes a visible light imaging region, an infrared light imaging region, and a transition region between said two regions, said image sensor operating under one of the visible light imaging mode and the infrared light imaging mode, wherein the visible light imaging region images the visible light passing through the visible light bandpass region under the visible light imaging mode, and the infrared light imaging region images the infrared light passing through the infrared bandpass region under the infrared light imaging mode, wherein the infrared light is from biological features;

wherein the eye image preview window previews and outputs the infrared light imaging region of the image sensor and outputs only the biological feature images of the infrared light imaging region.

22. The mobile terminal according to claim 21, wherein, the composite imaging camera module and the infrared light source are at an upper part of the screen along the length direction of the mobile terminal, wherein the visible light bandpass region is placed above the infrared light bandpass region along the length direction of the mobile terminal, and the visible light imaging region of the image sensor is placed above the infrared light imaging region along the length direction of the mobile terminal, such that when the mobile terminal is in use, the biological feature images are output in the eye image preview window by bringing the side of the mobile terminal including the composite imaging camera module to tilt towards the user.

23. The mobile terminal according to claim 21, wherein, the composite imaging camera module and the infrared light source are at an upper part and an lower part of the screen, respectively, along the length direction of the mobile terminal, wherein the visible light bandpass region is placed under the infrared light bandpass region along the length direction of the mobile terminal, and the visible light imaging region of the image sensor is placed under the infrared light imaging region along the length direction of the mobile terminal, such that when the mobile terminal is in use, the biological feature images are output in the eye image preview window by bringing the side of the mobile terminal including the composite imaging camera module to tilt away from the user and by performing translation control to ensure that the preview images in said eye image preview window are previews from the infrared light imaging region of the image sensor.

24. The mobile terminal according to claim 21, wherein, the screen further comprises an auxiliary infrared light source, and when the composite imaging camera module is under the infrared light imaging mode, the auxiliary infrared light source of the screen provides auxiliary infrared light illumination to the biological features.

* * * * *